US012782567B2

(12) United States Patent
Crouch et al.

(10) Patent No.: US 12,782,567 B2
(45) Date of Patent: Nov. 3, 2026

(54) METHOD AND SYSTEM FOR AUTOMATIC REAL-TIME ADAPTIVE SCANNING WITH OPTICAL RANGING SYSTEMS

(71) Applicant: Aurora Operations, Inc., Pittsburgh, PA (US)

(72) Inventors: Stephen Crouch, Palo Alto, CA (US); Randy R. Reibel, Palo Alto, CA (US); James Curry, Palo Alto, CA (US); Trenton Berg, Palo Alto, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 343 days.

(21) Appl. No.: 18/508,922

(22) Filed: Nov. 14, 2023

(65) Prior Publication Data

US 2024/0288582 A1 Aug. 29, 2024

Related U.S. Application Data

(63) Continuation of application No. 17/586,523, filed on Jan. 27, 2022, now Pat. No. 11,874,375, which is a (Continued)

(51) Int. Cl.
*G01S 17/42* (2006.01)
*G01S 13/18* (2006.01)
(Continued)

(52) U.S. Cl.
CPC .............. *G01S 17/42* (2013.01); *G01S 13/18* (2013.01); *G01S 13/343* (2013.01);
(Continued)

(58) Field of Classification Search
CPC ...... G01S 13/18; G01S 13/343; G01S 13/428; G01S 13/526; G01S 13/582; G01S 17/18;
(Continued)

(56) References Cited

U.S. PATENT DOCUMENTS 4,099,249 A 7/1978 Casasent
4,620,192 A 10/1986 Collins
(Continued)

FOREIGN PATENT DOCUMENTS

CN 101346773 A 1/2009
CN 102150007 A 8/2011
(Continued)

OTHER PUBLICATIONS

EP Communication pursuant to Article 94(3) re EP Application No. 21825648.5 dated May 13, 2024.

(Continued)

*Primary Examiner* — Timothy X Pham
(74) *Attorney, Agent, or Firm* — Dority & Manning, P.A.

(57) ABSTRACT

Techniques for automatic adaptive scanning with a laser scanner include obtaining range measurements at a coarse angular resolution and forming a horizontally sorted range gate subset and a characteristic range. A fine angular resolution is determined automatically based on the characteristic range and a target spatial resolution. If the fine angular resolution is finer than the coarse angular resolution, then a minimum and maximum vertical angle is automatically determined in each horizontal slice extending a bin size from any previous horizontal slice. A set of adaptive minimum and maximum vertical angles is determined automatically by dilating and interpolating the minimum and maximum vertical angles of all the slices to the second horizontal angular resolution. A horizontal start angle, and the set of adaptive minimum and maximum vertical angles are sent to cause the ranging system to obtain measurements at the second angular resolution.

20 Claims, 19 Drawing Sheets

Related U.S. Application Data continuation of application No. 16/464,648, filed as application No. PCT/US2017/062708 on Nov. 21, 2017, now Pat. No. 11,249,192.

(60) Provisional application No. 62/428,117, filed on Nov. 30, 2016.

(51) Int. Cl.
*G01S 13/34* (2006.01)
*G01S 13/42* (2006.01)
*G01S 13/526* (2006.01)
*G01S 13/58* (2006.01)
*G01S 17/89* (2020.01)

(52) U.S. Cl.
CPC .......... *G01S 13/428* (2013.01); *G01S 13/526* (2013.01); *G01S 13/582* (2013.01); *G01S 17/89* (2013.01)

(58) Field of Classification Search
CPC .......... G01S 17/26; G01S 17/34; G01S 17/42; G01S 17/89; G01S 7/4817; G01S 7/497
See application file for complete search history.

(56) References Cited

U.S. PATENT DOCUMENTS

| | | | |
|---|---|---|---|
| 4,648,276 | A | 3/1987 | Klepper et al. |
| 4,804,893 | A | 2/1989 | Melocik |
| 5,075,864 | A | 12/1991 | Sakai |
| 5,216,534 | A | 6/1993 | Boardman et al. |
| 5,223,986 | A | 6/1993 | Mayerjak et al. |
| 5,227,910 | A | 7/1993 | Khattak |
| 5,231,401 | A | 7/1993 | Kaman et al. |
| 5,687,017 | A | 11/1997 | Katoh et al. |
| 5,781,156 | A | 7/1998 | Krasner |
| 5,828,585 | A | 10/1998 | Welk et al. |
| 5,917,640 | A | 6/1999 | Staver |
| 5,946,125 | A | 8/1999 | Ang |
| 5,947,903 | A | 9/1999 | Ohtsuki et al. |
| 5,999,302 | A | 12/1999 | Sweeney et al. |
| 6,029,496 | A | 2/2000 | Kreft |
| 6,211,888 | B1 | 4/2001 | Ohtsuki et al. |
| 6,671,595 | B2 | 12/2003 | Lu et al. |
| 6,753,950 | B2 | 6/2004 | Morcom |
| 6,871,148 | B2 | 3/2005 | Morgen et al. |
| 6,931,055 | B1 | 8/2005 | Underbrink et al. |
| 7,122,691 | B2 | 10/2006 | Oshima et al. |
| 7,152,490 | B1 | 12/2006 | Freund et al. |
| 7,486,802 | B2 | 2/2009 | Hougen |
| 7,511,824 | B2 | 3/2009 | Sebastian et al. |
| 7,639,347 | B2 | 12/2009 | Eaton |
| 7,742,152 | B2 | 6/2010 | Hui et al. |
| 7,917,039 | B1 | 3/2011 | Delfyett |
| 8,135,513 | B2 | 3/2012 | Bauer et al. |
| 8,531,650 | B2 | 9/2013 | Feldkhun et al. |
| 8,751,155 | B2 | 6/2014 | Lee |
| 8,805,197 | B2 | 8/2014 | Delfyett |
| 8,818,609 | B1 | 8/2014 | Boyko et al. |
| 8,831,780 | B2 | 9/2014 | Zelivinski et al. |
| 8,954,252 | B1 | 2/2015 | Urmson et al. |
| 9,041,915 | B2 | 5/2015 | Earhart et al. |
| 9,046,909 | B2 | 6/2015 | Leibowitz et al. |
| 9,086,273 | B1 | 7/2015 | Gruver et al. |
| 9,097,800 | B1 | 8/2015 | Zhu |
| 9,285,266 | B2 | 3/2016 | Nakamura et al. |
| 9,348,137 | B2 | 5/2016 | Plotkin et al. |
| 9,383,753 | B1 | 7/2016 | Templeton et al. |
| 9,607,220 | B1 | 3/2017 | Smith et al. |
| 9,618,742 | B1 | 4/2017 | Droz et al. |
| 9,753,462 | B2 | 9/2017 | Gilliland et al. |
| 10,036,812 | B2 | 7/2018 | Crouch et al. |
| 10,231,705 | B2 | 3/2019 | Lee |
| 10,345,434 | B2 | 7/2019 | Hinderling et al. |
| 10,422,649 | B2 | 9/2019 | Engelman et al. |
| 10,485,508 | B2 | 11/2019 | Miyaji et al. |
| 10,520,602 | B2 | 12/2019 | Villeneuve et al. |
| 10,534,084 | B2 | 1/2020 | Crouch et al. |
| 10,568,258 | B2 | 2/2020 | Wahlgren |
| 10,571,567 | B2 | 2/2020 | Campbell et al. |
| 11,002,856 | B2 | 5/2021 | Heidrich et al. |
| 11,041,954 | B2 | 6/2021 | Crouch et al. |
| 11,249,192 | B2 | 2/2022 | Crouch et al. |
| 11,402,506 | B2 | 8/2022 | Ohtomo et al. |
| 11,441,899 | B2 | 9/2022 | Pivac et al. |
| 2002/0071109 | A1 | 6/2002 | Allen et al. |
| 2002/0140924 | A1 | 10/2002 | Wangler et al. |
| 2003/0117312 | A1 | 6/2003 | Nakanishi et al. |
| 2004/0034304 | A1 | 2/2004 | Sumi |
| 2004/0109155 | A1 | 6/2004 | Deines |
| 2004/0158155 | A1 | 8/2004 | Njemanze |
| 2004/0222366 | A1 | 11/2004 | Frick |
| 2005/0023356 | A1* | 2/2005 | Wiklof .............. G01B 11/2513 235/462.42 |
| 2005/0149240 | A1 | 7/2005 | Tseng et al. |
| 2005/0224583 | A1 | 10/2005 | Tamburrini et al. |
| 2006/0017912 | A1 | 1/2006 | Egawa |
| 2006/0132752 | A1 | 6/2006 | Kane |
| 2006/0239312 | A1 | 10/2006 | Kewitsch et al. |
| 2007/0005212 | A1 | 1/2007 | Xu et al. |
| 2008/0018881 | A1 | 1/2008 | Hui et al. |
| 2008/0024756 | A1 | 1/2008 | Rogers |
| 2008/0040029 | A1 | 2/2008 | Breed |
| 2008/0100822 | A1 | 5/2008 | Munro |
| 2009/0002679 | A1 | 1/2009 | Ruff et al. |
| 2009/0009842 | A1 | 1/2009 | Destain et al. |
| 2009/0030605 | A1 | 1/2009 | Breed |
| 2010/0046826 | A1* | 2/2010 | Dirix .................... B07C 5/3422 382/141 |
| 2010/0094499 | A1 | 4/2010 | Anderson |
| 2010/0183309 | A1 | 7/2010 | Etemad et al. |
| 2010/0188504 | A1 | 7/2010 | Dimsdale et al. |
| 2010/0312432 | A1 | 12/2010 | Hamada et al. |
| 2011/0007299 | A1 | 1/2011 | Moench et al. |
| 2011/0015526 | A1 | 1/2011 | Tamura |
| 2011/0026007 | A1 | 2/2011 | Gammenthaler |
| 2011/0026008 | A1 | 2/2011 | Gammenthaler |
| 2011/0205523 | A1 | 8/2011 | Rezk et al. |
| 2011/0292371 | A1 | 12/2011 | Chang |
| 2012/0038902 | A1 | 2/2012 | Dotson |
| 2012/0127252 | A1 | 5/2012 | Lim et al. |
| 2012/0229627 | A1 | 9/2012 | Wang |
| 2012/0242972 | A1* | 9/2012 | Wee ..................... G01S 17/931 356/4.01 |
| 2012/0274922 | A1 | 11/2012 | Hodge |
| 2012/0281907 | A1 | 11/2012 | Samples et al. |
| 2012/0306383 | A1 | 12/2012 | Munro |
| 2013/0120989 | A1 | 5/2013 | Sun et al. |
| 2013/0175343 | A1 | 7/2013 | Good |
| 2013/0268163 | A1 | 10/2013 | Comfort et al. |
| 2013/0325244 | A1 | 12/2013 | Wang et al. |
| 2014/0036252 | A1 | 2/2014 | Amzajerdian et al. |
| 2014/0064607 | A1 | 3/2014 | Grossmann et al. |
| 2015/0005993 | A1 | 1/2015 | Breuing |
| 2015/0046119 | A1 | 2/2015 | Sandhawalia et al. |
| 2015/0130607 | A1 | 5/2015 | Macarthur |
| 2015/0160332 | A1 | 6/2015 | Sebastian et al. |
| 2015/0177379 | A1 | 6/2015 | Smith et al. |
| 2015/0185244 | A1 | 7/2015 | Inoue et al. |
| 2015/0260836 | A1 | 9/2015 | Hayakawa |
| 2015/0267433 | A1 | 9/2015 | Leonessa et al. |
| 2015/0269438 | A1 | 9/2015 | Samarasekera et al. |
| 2015/0270838 | A1 | 9/2015 | Chan et al. |
| 2015/0282707 | A1 | 10/2015 | Tanabe et al. |
| 2015/0323660 | A1 | 11/2015 | Hampikian |
| 2015/0331103 | A1 | 11/2015 | Jensen |
| 2015/0331111 | A1 | 11/2015 | Newman et al. |
| 2016/0078303 | A1 | 3/2016 | Samarasekera et al. |
| 2016/0084946 | A1 | 3/2016 | Turbide |
| 2016/0091599 | A1 | 3/2016 | Jenkins |
| 2016/0123720 | A1 | 5/2016 | Thorpe et al. |
| 2016/0125739 | A1 | 5/2016 | Stewart et al. |
| 2016/0216366 | A1 | 7/2016 | Phillips et al. |

(56) References Cited

U.S. PATENT DOCUMENTS

| | | | |
|---|---|---|---|
| 2016/0245903 | A1 | 8/2016 | Kalscheur et al. |
| 2016/0260324 | A1 | 9/2016 | Tummala et al. |
| 2016/0266243 | A1 | 9/2016 | Marron |
| 2016/0274589 | A1 | 9/2016 | Templeton et al. |
| 2016/0350926 | A1 | 12/2016 | Flint et al. |
| 2016/0377721 | A1 | 12/2016 | Lardin et al. |
| 2016/0377724 | A1 | 12/2016 | Crouch et al. |
| 2017/0160541 | A1 | 6/2017 | Carothers et al. |
| 2017/0248691 | A1 | 8/2017 | Mcphee et al. |
| 2017/0299697 | A1 | 10/2017 | Swanson |
| 2017/0329014 | A1 | 11/2017 | Moon et al. |
| 2017/0329332 | A1 | 11/2017 | Pilarski et al. |
| 2017/0343652 | A1 | 11/2017 | De Mersseman et al. |
| 2017/0350964 | A1 | 12/2017 | Kaneda |
| 2017/0350979 | A1 | 12/2017 | Uyeno et al. |
| 2017/0356983 | A1 | 12/2017 | Jeong et al. |
| 2018/0003805 | A1 | 1/2018 | Popovich et al. |
| 2018/0136000 | A1 | 5/2018 | Rasmusson et al. |
| 2018/0188355 | A1 | 7/2018 | Bao et al. |
| 2018/0224547 | A1 | 8/2018 | Crouch et al. |
| 2018/0267556 | A1 | 9/2018 | Templeton et al. |
| 2018/0275252 | A1 | 9/2018 | Fried et al. |
| 2018/0276986 | A1 | 9/2018 | Delp |
| 2018/0284279 | A1 | 10/2018 | Campbell et al. |
| 2018/0284286 | A1 | 10/2018 | Eichenholz et al. |
| 2018/0299534 | A1 | 10/2018 | Lachapelle et al. |
| 2018/0307913 | A1 | 10/2018 | Finn et al. |
| 2019/0064831 | A1 | 2/2019 | Gali et al. |
| 2019/0072383 | A1* | 3/2019 | Justice .................. G01S 17/894 |
| 2019/0086514 | A1 | 3/2019 | Dussan et al. |
| 2019/0107606 | A1 | 4/2019 | Russell et al. |
| 2019/0154439 | A1 | 5/2019 | Binder |
| 2019/0154816 | A1 | 5/2019 | Hughes et al. |
| 2019/0154829 | A1 | 5/2019 | Mcwhirter et al. |
| 2019/0154832 | A1 | 5/2019 | Maleki et al. |
| 2019/0154835 | A1 | 5/2019 | Maleki et al. |
| 2019/0258251 | A1 | 8/2019 | Ditty et al. |
| 2019/0310468 | A1 | 10/2019 | Sapir |
| 2019/0310469 | A1 | 10/2019 | Sapir |
| 2019/0317219 | A1 | 10/2019 | Smith et al. |
| 2019/0318206 | A1 | 10/2019 | Smith et al. |
| 2019/0346856 | A1 | 11/2019 | Berkemeier et al. |
| 2019/0361119 | A1 | 11/2019 | Kim et al. |
| 2019/0383911 | A1 | 12/2019 | Zhang et al. |
| 2020/0025879 | A1 | 1/2020 | Pacala et al. |
| 2020/0049819 | A1 | 2/2020 | Cho et al. |
| 2020/0088848 | A1 | 3/2020 | Kremer et al. |
| 2020/0166647 | A1 | 5/2020 | Crouch et al. |
| 2020/0166697 | A1 | 5/2020 | Towe |
| 2020/0217936 | A1 | 7/2020 | Galloway et al. |
| 2020/0278425 | A1 | 9/2020 | Angus et al. |
| 2021/0089047 | A1 | 3/2021 | Smith et al. |
| 2021/0165102 | A1 | 6/2021 | Crouch et al. |
| 2021/0325664 | A1 | 10/2021 | Adams et al. |
| 2022/0260686 | A1 | 8/2022 | Wang et al. |
| 2022/0413260 | A1 | 12/2022 | Gassend et al. |

FOREIGN PATENT DOCUMENTS

| | | | |
|---|---|---|---|
| CN | 103227559 | A | 7/2013 |
| CN | 103608696 | A | 2/2014 |
| CN | 104793619 | A | 7/2015 |
| CN | 104914445 | A | 9/2015 |
| CN | 104956400 | A | 9/2015 |
| CN | 204679638 | U | 9/2015 |
| CN | 105116922 | A | 12/2015 |
| CN | 105425245 | A | 3/2016 |
| CN | 105629258 | A | 6/2016 |
| CN | 105652282 | A | 6/2016 |
| CN | 107015238 | A | 8/2017 |
| CN | 107193011 | A | 9/2017 |
| CN | 207318710 | U | 5/2018 |
| CN | 109557551 | A | 4/2019 |
| DE | 10 2007 001 103 | A1 | 7/2008 |
| DE | 10 2017 200 692 | A1 | 8/2018 |
| EP | 1 298 453 | A2 | 4/2003 |
| EP | 3 330 766 | A1 | 6/2018 |
| FR | 2568688 | A1 | 2/1986 |
| GB | 2 349 231 | A | 10/2000 |
| JP | S63-071674 | A | 4/1988 |
| JP | H06-148556 | A | 5/1994 |
| JP | H09-257415 | A | 10/1997 |
| JP | 2765767 | B2 | 6/1998 |
| JP | H11-153664 | A | 6/1999 |
| JP | 2000-338244 | A | 12/2000 |
| JP | 2001050723 | A | 2/2001 |
| JP | 2002-249058 | A | 9/2002 |
| JP | 3422720 | B2 | 6/2003 |
| JP | 2003-185738 | A | 7/2003 |
| JP | 2006-148556 | A | 6/2006 |
| JP | 2006-226931 | A | 8/2006 |
| JP | 2007-155467 | A | 6/2007 |
| JP | 2007-214564 | A | 8/2007 |
| JP | 2007-214694 | A | 8/2007 |
| JP | 2009-257415 | A | 11/2009 |
| JP | 2009-291294 | A | 12/2009 |
| JP | 2011-044750 | A | 3/2011 |
| JP | 2011-107165 | A | 6/2011 |
| JP | 2011-203122 | A | 10/2011 |
| JP | 2012-502301 | A | 1/2012 |
| JP | 2012-103118 | A | 5/2012 |
| JP | 2012-154863 | A | 8/2012 |
| JP | 2015-125062 | A | 7/2015 |
| JP | 2015-172510 | A | 10/2015 |
| JP | 2015-212942 | A | 11/2015 |
| JP | 2017-097199 | A | 6/2017 |
| JP | 2018-173346 | A | 11/2018 |
| JP | 2018-204970 | A | 12/2018 |
| KR | 2018-0058068 | A | 5/2018 |
| KR | 2018-0126927 | A | 11/2018 |
| TW | 201516612 | A | 5/2015 |
| TW | 201818183 | A | 5/2018 |
| TW | 201832039 | A | 9/2018 |
| TW | 201833706 | A | 9/2018 |
| TW | 202008702 | A | 2/2020 |
| WO | WO-2007/124063 | A2 | 11/2007 |
| WO | WO-2010/127151 | A2 | 11/2010 |
| WO | WO-2011/102130 | A1 | 8/2011 |
| WO | WO-2012/117542 | A1 | 9/2012 |
| WO | WO-2014/011241 | A2 | 1/2014 |
| WO | WO-2014/132020 | A1 | 9/2014 |
| WO | WO-2015/037173 | A1 | 3/2015 |
| WO | WO-2016/134321 | A1 | 8/2016 |
| WO | WO-2016/164435 | A1 | 10/2016 |
| WO | WO-2017/018065 | A1 | 2/2017 |
| WO | WO-2018/011945 | A1 | 1/2018 |
| WO | WO-2018/066069 | A1 | 4/2018 |
| WO | WO-2018/067158 | A1 | 4/2018 |
| WO | WO-2018/102188 | A1 | 6/2018 |
| WO | WO-2018/102190 | A1 | 6/2018 |
| WO | WO-2018/107237 | A1 | 6/2018 |
| WO | WO-2018/125438 | A2 | 7/2018 |
| WO | WO-2018/144853 | A1 | 8/2018 |
| WO | WO-2018/160240 | A2 | 9/2018 |
| WO | WO-2019/014177 | A1 | 1/2019 |
| WO | WO-2019/133101 | A1 | 7/2019 |
| WO | WO-2020/062301 | A1 | 4/2020 |

OTHER PUBLICATIONS

Office Action issued in connection with Chinese Appl. No. 202311474513.1 dated Oct. 17, 2024.

Adany, P. et al., "Chirped Lidar Using Simplified Homodyne Detection," Journal of Lightwave Technology, vol. 27, No. 16, Aug. 15, 2009, pp. 3351-3357.

Anonymous, "Fundamentals of Direct Digital Synthesis," Analog Devices, MT-085 Tutorial Rev. D, copyright 2009, pp. 1-9.

Anonymous, "Occlusion-Shadows and Occlusion-Peachpit", Jul. 3, 2006 (Jul. 3, 2006), P055697780, Retrieved from the Internet: URL:https://www.peachpit.com/articles/article.aspx?p=486505&seqNum=7[retrieved on May 25, 2020] 2 pages.

(56) References Cited

OTHER PUBLICATIONS

Aull, B. et al., "Geiger-Mode Avalanche Photodiodes for Three-Dimensional Imaging," Lincoln Laboratory Journal, vol. 13, No. 2, 2002, pp. 335-350.
Bashkansky, M. et al., "RF phase-coded random-modulation LIDAR," Optics Communications, vol. 231, 2004, pp. 93-98.
Beck, S. et al., "Synthetic-aperture imaging laser radar: laboratory demonstration and signal processing," Applied Optics, vol. 44, No. 35, Dec. 10, 2005, pp. 7621-7629.
Berkovic, G. and Shafir, E., "Optical methods for distance and displacement measurements", Advances in Optics and Photonics, vol. 4, Issue 4, Dec. 2012, pp. 441-471.
Besl, P. and Mckay, N., "A Method for Registration of 3-D shapes", IEEE Transactions on Pattern Analysis and Machine Intelligence, vol. 14, No. 2, Feb. 1992, pp. 239-256.
Campbell, J. et al., "Super-resolution technique for CW lidar using Fourier transform reordering and Richardson-Lucy deconvolution." Optics Letters, vol. 39, No. 24, Dec. 15, 2014, pp. 6981-6984.
Canadian Office Action issued in connection with CA Appl. Ser. No. 3179657 dated Dec. 16, 2022 (4 pages).
Cao, X. et al., "Lidar Signal Depolarization by Solid Targets and its Application to Terrain Mapping and 3D Imagery," Defence R&D, Contract Report DRDC Valcartier CR 2011-236, Mar. 2011, retrieved at URL:http://publications.gc.ca/collections/collection_2016/rddc-drdc/D68-3-236-2011-eng.pdf, pp. 1-74.
Cheng, H., "Autonomous Intelligent Vehicles: Theory, Algorithms, and Implementation", copyright 2011, Springer, retrieved from http://ebookcentral.proquest.com, created from epo-ebooks on Jun. 1, 2020, 24 pages.
Chester, David B. "A Parameterized Simulation of Doppler Lidar", All Graduate Thesis and Dissertions, Dec. 2017, Issue 6794, <URL: https://digitalcommons.usu.edu/etd/6794 > * pp. 13-14, 27-28, 45*.
Chinese Office Action issued in related CN Appl. Ser. No. 201780081804.0 dated Dec. 1, 2022 (20 pages).
Chinese Office Action on CN Appl. Ser. No. 201880009947.5 dated Oct. 11, 2021 (5 pages).
Contu, F., "The Do's and Don'ts of High Speed Serial Design in FPGA's". Xilinix All Programmable, Copyright 2013, High Speed Digital Design & Validation Seminars 2013, pp. 1-61.
Corrected Notice of Allowance on US Appl. U.S. Appl. No. 16/725,419 dated May 28, 2020 (2 pages).
Crouch, S. and Barber, Z., "Laboratory demonstrations of interferometric and spotlight synthetic aperture ladar techniques," Optics Express, vol. 20, No. 22, Oct. 22, 2012, pp. 24237-24246.
Crouch, S. et al., "Three dimensional digital holographic aperture synthesis", Optics Express, vol. 23, No. 18, Sep. 7, 2015, pp. 23811-23816.
Dapore, B. et al., "Phase noise analysis of two wavelength coherent imaging system", Optics Express, vol. 21, No. 25, Dec. 16, 2013, pp. 30642-30652.
Decision of Rejection on JP Appl. Ser. No. 2019-527155 dated Jun. 8, 2021 (8 pages).
Decision of Rejection on JP Appl. Ser. No. 2020-559530 dated Aug. 31, 2021 (13 pages).
Duncan, B. and Dierking, M., "Holographic aperture ladar: erratum", Applied Optics, vol. 52, No. 4, Feb. 1, 2013, pp. 706-708.
Duncan, B. et al., "Holographic aperture ladar", Applied Optics, vol. 48, Issue 6, Feb. 20, 2009, pp. 1168-1177.
El Gayar, N. (Ed.) et al., "Multiple Classifier Systems", 9th International Workshop, International Workshop on Multiple Classifier Systems, MCS 2010, Cairo, Egypt, Apr. 7-9, 2010, specifically Farhad Samadzadegan et al., "A Multiple Classifier System for Classification of LIDAR Remote Sensing Data Using Multi-class SVM", pp. 254-263 (337 total pages).
Examination Report on EP Appl. Ser. No. 17898933.1 dated May 25, 2022 (5 pages).
Examination Report on EP Appl. Ser. No. 19791789.1 dated Dec. 21, 2021 (12 pages).
Extended European Search Report issued in connection with EP Appl. No. 21825648.5 dated Aug. 8, 2023.
Extended European Search Report on EP Appl. Ser. No. 17876081.5 dated Jun. 3, 2020 (9 pages).
Extended European Search Report on EP Appl. Ser. No. 17876731.5 dated Jun. 17, 2020 (14 pages).
Extended European Search Report on EP Appl. Ser. No. 17888807.9 dated Jun. 3, 2020 (9 pages).
Extended European Search Report on EP Appl. Ser. No. 17898933.1 dated May 12, 2020 (7 pages).
Farhad Samadzadegan et al., "A Multiple Classifier System for Classification of LIDAR Remote Sensing Data Using Multi-class SVM", International Workshop on Multiple Classifier Systems, MCS 2010, Lecture Notes in Computer Science, 2010, vol. 5997, pp. 254-263.
Fehr, D. et al., "Compact Covariance descriptors in 3D point clouds for object recognition," presented at the Robotics and Automation (ICRA), May 14, 2012, IEEE International Conference, pp. 1793-1798.
Final US Office Action on U.S. Appl. No. 17/331,362 dated Nov. 29, 2021 (17 pages).
First Office Action on CN Appl. Ser. No. 201780081215.2 dated Mar. 3, 2021 (14 pages).
First Office Action on CN Appl. Ser. No. 201980033898.3 dated Apr. 20, 2021 (14 pages).
Foreign Action other than Search Report on CN Dtd Apr. 5, 2023.
Foreign Action other than Search Report on EP 17876081.5 DTD Jun. 1, 2022.
Foreign Action other than Search Report on IL Dtd Feb. 22, 2023.
Foucras, M. et al., "Detailed Analysis of the Impact of the Code Doppler on the Acquisition Performance of New GNSS Signals," ION ITM, International Technical Meeting of The Institute of Navigation, San Diego, California, Jan. 27, 2014, pp. 1-13.
Garcia Monreal, J. et al., "Detection of Three Dimensional Objects Based on Phase Encoded Range Images", Sixth International Conference on Correlation Optics, vol. 5477, Jun. 4, 2004, pp. 269-280.
Griggs, R.(Ed.), "Implementation Agreement for Integrated Dual Polarization Micro-Intradyne Coherent Receivers", OIF (Optical Internetworking Forum), IA# OIF-DPC-MRX-01.0, Mar. 31, 2015, pp. 1-32.
Haralick, R. et al., "Image Analysis Using Mathematical Morphology," IEEE Transactions In Pattern Analysis and Machine Intelligence, Jul. 1987, vol. PAMI-9, No. 4, pp. 532-550.
International Preliminary Report and Written Opinion on Patentability on Appl. Ser. No. PCT/US2018/041388 dated Jan. 23, 2020 (12 pages).
International Preliminary Report and Written Opinion on Patentability on Appl. Ser. No. PCT/US2019/028532 dated Oct. 27, 2020 (11 pages).
International Preliminary Report and Written Opinion on Patentability on Appl. Ser. No. PCT/US2019/068351 dated Jul. 15, 2021 (8 pages).
International Preliminary Report on Patentability on PCT Appl. Ser. No. PCT/US2021/038089 dated Dec. 29, 2022 (5 pages).
International Search Report and Written Opinion on Appl. Ser. No. PCT/US2017/062703 dated Aug. 27, 2018 (13 pages).
International Search Report and Written Opinion on Appl. Ser. No. PCT/US2017/062708 dated Mar. 16, 2018 (14 pages).
International Search Report and Written Opinion on Appl. Ser. No. PCT/US2017/062714 dated Aug. 23, 2018 (13 pages).
International Search Report and Written Opinion on Appl. Ser. No. PCT/US2017/062721 dated Feb. 6, 2018 (12 pages).
International Search Report and Written Opinion on Appl. Ser. No. PCT/US2018/016632 dated Apr. 24, 2018 (6 pages).
International Search Report and Written Opinion on Appl. Ser. No. PCT/US2018/041388 dated Sep. 20, 2018 (13 pages).
International Search Report and Written Opinion on Appl. Ser. No. PCT/US2018/044007 dated Oct. 25, 2018 (17 pages).
International Search Report and Written Opinion on Appl. Ser. No. PCT/US2019/028532 dated Aug. 16, 2019 (16 pages).
International Search Report and Written Opinion on Appl. Ser. No. PCT/US2019/068351 dated Apr. 9, 2020 (14 pages).
International Search Report and Written Opinion on Appl. Ser. No. PCT/US2021/032515 dated Aug. 3, 2021 (18 pages).

(56) References Cited

OTHER PUBLICATIONS

International Search Report and Written Opinion on PCT Appl. Ser. No. PCT/US2021/038089 dated Jul. 21, 2021 (6 pages).
Japanese Office Action issued in connection with JP Appl. Ser. No. 2022-570662 dated Apr. 25, 2023.
Johnson, A. et al., "Using spin images for efficient object recognition in cluttered 3D scenes", IEEE Trans. Pattern Anal. Mach. Intell., vol. 21, No. 5, May 1999, pp. 433-448.
Johnson, A., "Spin-Images: A Representation for 3-D Surface Matching," doctoral dissertation, tech. report CMU-RI-TR-97-47, Robotics Institute, Carnegie Mellon University, Aug. 1997, 308 pages.
Kachelmyer, A., "Range-Doppler Imaging with a Laser Radar", The Lincoln Laboratory Journal, vol. 3, No. 1, 1990, pp. 87-118.
Klasing, K. et al., "Comparison of Surface Normal Estimation Methods for Range Sensing Applications," 2009 IEEE International Conference on Robotics and Automation, May 12, 2009, pp. 3206-3211.
Korean Office Action issued in connection with KR Appl. Ser. No. 10-2021-7023519 dated Feb. 13, 2023 (15 pages).
Krause, B. et al., "Motion compensated frequency modulated continuous wave 3D coherent imaging ladar with scannerless architecture", Applied Optics, vol. 51, No. 36, Dec. 20, 2012, pp. 8745-8761.
Le, T., "Arbitrary Power Splitting Couplers Based on 3x3 Multimode Interference Structures for All-Optical Computing", LACSIT International Journal of Engineering and Technology, vol. 3, No. 5, Oct. 2011, pp. 565-569.
Lin, C. et al.; "Eigen-feature analysis of weighted covariance matrices for LiDAR point cloud classification", ISPRS Journal of Photogrammetry and Remote Sensing, vol. 94, Aug. 1, 2014 (30 pages).
Lu et al., "Recognizing objects in 3D point clouds with multi-scale features", Sensors 2014, 14, 24156-24173; doi: 10.3390/s141224156 (Year: 2014).
Lu, M. et al., "Recognizing Objects in 3D Point Clouds with Multi-Scale Local Features," Sensors 2014, Dec. 15, 2014, retrieved at URL:www.mdpi.com/1424-8220/14/12/24156/pdf, pp. 24156-24173.
Mackinnon, D. et al., "Adaptive laser range scanning", American Control Conference, Piscataway, NJ, 2008, pp. 3857-3862.
Marron, J. et al., "Three-dimensional Lensless Imaging Using Laser Frequency Diversity", Applied Optics, vol. 31, No. 2, Jan. 10, 1992, pp. 255-262.
Miyasaka, T. et al., "Moving Object Tracking and Identification in Traveling Environment Using High Resolution Laser Radar", Graphic Information Industrial, vol. 43, No. 2, pp. 61-69, Feb. 1, 2011.
Munkres, J., "Algorithms for the Assignment and Transportation Problems", Journal of the Society for Industrial and Applied Mathematics, vol. 5, No. 1, Mar. 1957, pp. 32-38.
Non-Final Office Action on U.S. Appl. No. 17/509,986 DTD Jun. 30, 2023.
Non-Final Office Action on U.S. Appl. No. 17/586,523 dated May 18, 2023 (8 pages).
Non-Final Office Action on U.S. Appl. No. 16/464,648 dated Jun. 1, 2021 (6 pages).
Non-Final Office Action on U.S. Appl. No. 16/464,657 dated Dec. 22, 2021 (17 pages).
Non-Final Office Action on U.S. Appl. No. 16/725,419 dated Feb. 24, 2020 (4 pages).
Non-Final Office Action on U.S. Appl. No. 16/906,378 dated Sep. 4, 2020 (5 pages).
Non-Final Office Action on U.S. Appl. No. 17/167,862 dated Apr. 1, 2021 (13 pages).
Notice of Allowance for U.S. Appl. No. 16/725,399 dated Dec. 3, 2020 (11 pages).
Notice of Allowance on KR Appl. Ser. No. 10-2019-7019062 dated Feb. 10, 2021 (4 Pages).
Notice of Allowance on KR Appl. Ser. No. 10-2019-7019076 dated Feb. 15, 2021 (4 pages).
Notice of Allowance on KR Appl. Ser. No. 10-2019-7019078 dated Feb. 15, 2021 (4 pages).
Notice of Allowance on U.S. Appl. No. 17/586,523 dated Aug. 30, 2023 (7 pages).
Notice of Allowance on U.S. Appl. No. 16/464,648 dated Oct. 13, 2021 (7 pages).
Notice of Allowance on U.S. Appl. No. 15/423,978 dated Jul. 15, 2019 (8 pages).
Notice of Allowance on U.S. Appl. No. 15/645,311 dated Apr. 18, 2019 (13 pages).
Notice of Allowance on U.S. Appl. No. 16/515,538 dated Feb. 23, 2021 (16 pages).
Notice of Allowance on U.S. Appl. No. 16/725,419 dated Apr. 15, 2020 (9 pages).
Notice of Allowance on U.S. Appl. No. 16/906,378 dated Nov. 5, 2020 (8 pages).
Notice of Allowance on U.S. Appl. No. 17/167,862 dated Jul. 28, 2021 (9 pages).
Notice of Preliminary Rejection on KR Appl. Ser. No. 10-2021-7014545 dated Aug. 19, 2021 (17 pages).
Notice of Preliminary Rejection on KR Appl. Ser. No. 10-2021-7014560 dated Aug. 19, 2021 (5 pages).
Notice of Preliminary Rejection on KR Appl. Ser. No. 10-2021-7019744 dated Aug. 19, 2021 (15 pages).
Notice of Reasons for Refusal on JP Appl. Ser. No. 2019-527156 dated Dec. 1, 2020 (12 pages).
Notice of Reasons for Refusal on JP Appl. Ser. No. 2020-559530 dated Apr. 20, 2021 (11 pages).
Notice of Reasons for Refusal on JP Appl. Ser. No. 2021-118743 dated Jun. 7, 2022 (9 pages).
Notice of Reasons for Refusal on JP Appl. Ser. No. 2021-165072 dated Apr. 19, 2022 (10 pages).
Notice of Reasons for Refusal on JP Appl. Ser. No. 2021-165072 dated Nov. 30, 2021 (9 pages).
Notice of Reasons for Refusal on JP Appl. Ser. No. 2021-538998 dated Apr. 26, 2022 (11 pages).
Notice of Reasons for Refusal on JP Appl. Ser. No. 2021-538998 dated Nov. 30, 2021 (20 pages).
Notice of Reasons for Rejection issued in connection with JP Appl. Ser. No. JP 2021-126516 dated Jun. 21, 2022 (16 pages).
Notice of Reasons of Rejection issued in connection with JP Appl. Ser. No. 2022-000212 dated Feb. 7, 2023.
O'Donnell, R., "Radar Systems Engineering Lecture 11 Waveforms and Pulse Compression," IEEE New Hampshire Section, Jan. 1, 2010, pp. 1-58.
Office Action issued in connection with Japanese Appl. No. 2022-569030 dated Aug. 22, 2023 (9 pages).
Office Action on JP App. Ser. No. 2019-527155 dated Dec. 1, 2020 (10 pages).
Office Action on JP Appl. Ser. No. 2019-527155 dated Dec. 1, 2020 (8 pages).
Office Action on JP Appl. Ser. No. 2019-527224 dated Dec. 1, 2020 (6 pages).
Office Action on JP Appl. Ser. No. 2019-538482 dated Feb. 2, 2021 (6 pages).
Office Action on KR Appl. Ser. No. 10-2019-7018575 dated Jun. 23, 2020 (4 pages).
Office Action on KR Appl. Ser. No. 10-2019-7019062 dated Oct. 5, 2020 (6 pages).
Office Action on KR Appl. Ser. No. 10-2019-7019076 dated Jun. 9, 2020 (18 pages).
Office Action on KR Appl. Ser. No. 10-2019-7019078 dated Jun. 9, 2020 (14 pages).
Office Action on KR Appl. Ser. No. 10-2019-7022921 dated Aug. 26, 2020 (6 pages).
Office Action on U.S. Appl. No. 15/423,978 dated Mar. 22, 2019 (6 pages).
Office Action on U.S. Appl. No. 17/331,362 dated Aug. 19, 2021 (17 pages).
Optoplex Corporation, "90 degree Optical Hybrid", Nov. 9, 2016, 2 pages.
Rabb, D. et al., "Multi-transmitter Aperture Synthesis", Optics Express, vol. 18, No. 24, Nov. 22, 2010, pp. 24937-24945.

(56) References Cited

OTHER PUBLICATIONS

Roos, P. et al., "Ultrabroadband optical chirp linearization for precision metrology applications", Optics Letters, vol. 34, No. 23, Dec. 1, 2009, pp. 3692-3694.
Salehian, H. et al., "Recursive Estimation of the Stein Center of SPD Matrices and Its Applications", 2013 IEEE International Conference on Computer Vision (ICCV), Dec. 1, 2013, pp. 1793-1800.
Samadzadegan, F. et al., "A Multiple Classifier System for Classification of LIDAR Remote Sensing Data Using Multi-class SVM", Multiple Classifier Systems, 9th International Workshop, MCS 2010, Cairo, Egypt, Apr. 7-9, 2010, pp. 254-263.
Satyan, N. et al., "Precise control of broadband frequency chirps using optoelectronic feedback", Optics Express, vol. 17, No. 18, Aug. 31, 2009, pp. 15991-15999.
Second Office Action for KR Appl. Ser. No. 10-2021-7020076 dated Jun. 30, 2021 (5 pages).
Second Office Action on CN Appl. Ser. No. 201780081968.3 dated May 12, 2021 (7 pages).
Stafford, J. et al., "Holographic aperture ladar with range compression," Journal of the Optical Society of America, vol. 34, No. 5, May 2017, pp. A1-A9.
Supplementary European Search Report on EP Appl. Ser. No. 18748729.3 dated Nov. 20, 2020 (8 pages).
Supplementary European Search Report on EP Appl. Ser. No. 18831205.2 dated Feb. 12, 2021 (7 pages).
Supplementary European Search Report on EP Appl. Ser. No. 19791789.1 dated Dec. 9, 2021 (4 pages).
Third Party Submission on U.S. Appl. No. 16/725,375, filed Jun. 25, 2020 (73 pages).
Tippie, A. et al., "High-resolution synthetic-aperture digital holography with digital phase and pupil correction", Optics Express, vol. 19, No. 13, Jun. 20, 2011, pp. 12027-12038.
Weinmann, M. et al., "Semantic point cloud interpretation based on optimal neighborhoods, relevant features and efficient classifiers", ISPRS Journal of Photogrammetry and Remote Sensing, vol. 105, Feb. 27, 2015, pp. 286-304.
Wikipedia, "Digital-to-analog converter", retrieved from https://en.wikipedia.org/wiki/Digital-to-analog_converter, on Apr. 15, 2017, 7 pages.
Wikipedia, "Field-programmable gate array", retrieved from https://en.wikipedia.org/wiki/Field-programmable_gate_array, on Apr. 15, 2017, 13 pages.
Wikipedia, "In-phase and quadrature components", retrieved from https://en.wikipedia.org/wiki/In-phase_and_quadrature_components, on Jan. 26, 2018, 3 pages.
Wikipedia, "Phase-shift keying", retrieved from https://en.wikipedia.org/wiki/Phase-shift_keying#Binary_phase-shift_keying.28BPSK.29, on Oct. 23, 2016, 9 pages.
Ye, J., "Least Squares Linear Discriminant Analysis", 24th International Conference on Machine Learning, pp. 1087-1093 (as of Nov. 27, 2016).
Office Action issued in connection with Chinese Appl. No. 202310820368.1 dated Feb. 28, 2024.

* cited by examiner

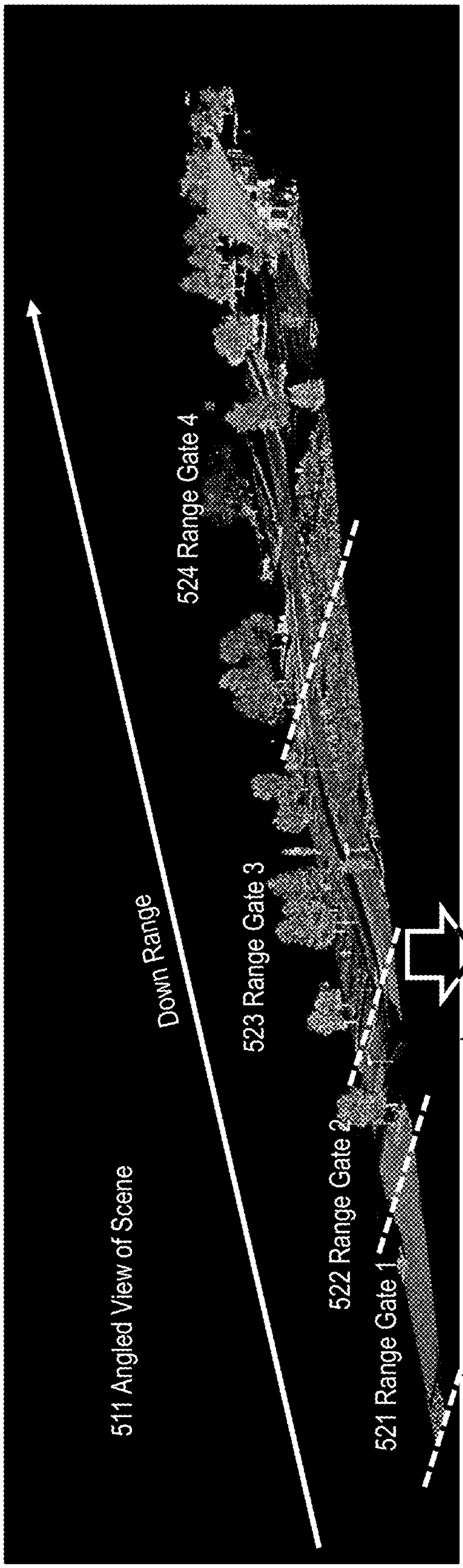
FIG. 6A
FIG. 6D
Range Gate 3 Pattern
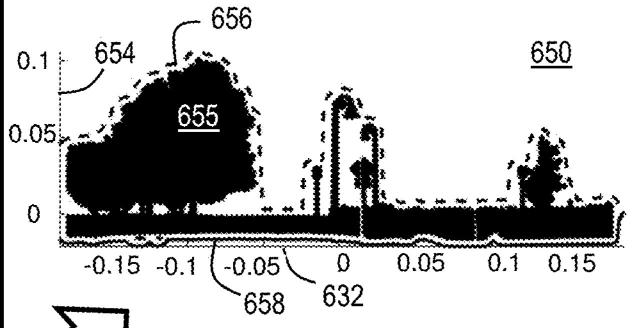
FIG. 6C
Range Gate 2 Pattern
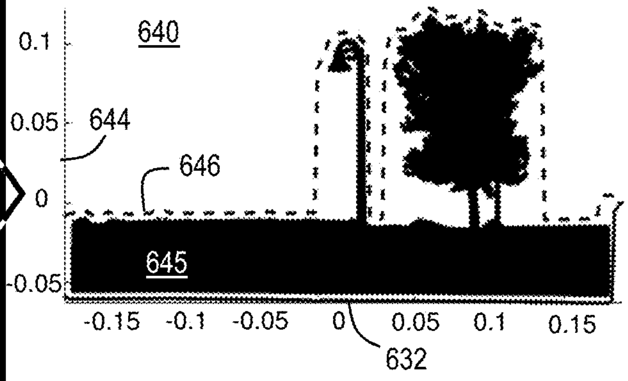
FIG. 6B
Range Gate 1 Pattern
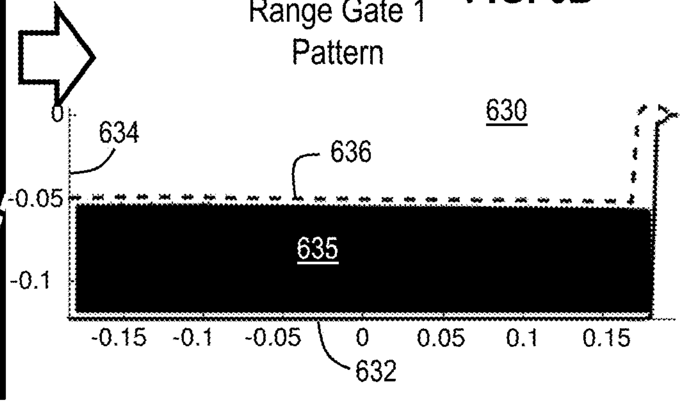

METHOD AND SYSTEM FOR AUTOMATIC REAL-TIME ADAPTIVE SCANNING WITH OPTICAL RANGING SYSTEMS

CROSS-REFERENCE TO RELATED APPLICATIONS

This application is a continuation of U.S. patent application Ser. No. 17/586,523, filed Jan. 27, 2022, which is a continuation of U.S. patent application Ser. No. 16/464,648, filed May 28, 2019, which is a national stage application of International Application No. PCT/2017/062708, filed Nov. 21, 2017, which claims benefit of and priority to U.S. Provisional Application No. 62/428,117, filed Nov. 30, 2016. The disclosures of U.S. patent application Ser. No. 17/586,523, U.S. patent application Ser. No. 16/464,648, International Application No. PCT/US2017/062708, and U.S. Provisional Application No. 62/428,117 are incorporated herein by reference in their entireties.

STATEMENT OF GOVERNMENTAL INTEREST

This invention was made with government support under W9132V-14-C-0002 awarded by the Department of the Army. The government has certain rights in the invention.

BACKGROUND

Optical detection of range, often referenced by a mnemonic, LIDAR, for light detection and ranging, is used for a variety of applications, from altimetry, to imaging, to collision avoidance. LIDAR provides finer scale range resolution with smaller beam sizes than conventional microwave ranging systems, such as radio-wave detection and ranging (RADAR). Optical detection of range can be accomplished with several different techniques, including direct ranging based on round trip travel time of an optical pulse to an object, and chirped detection based on a frequency difference between a transmitted chirped optical signal and a returned signal scattered from an object, and phase encoded detection based on a sequence of single frequency phase changes that are distinguishable from natural signals.

To achieve acceptable range accuracy and detection sensitivity, direct long range LIDAR systems use short pulse lasers with low pulse repetition rate and extremely high pulse peak power. The high pulse power can lead to rapid degradation of optical components. Chirped and phase encoded LIDAR systems use long optical pulses with relatively low peak optical power. In this configuration, the range accuracy increases with the chirp bandwidth or length of the phase codes rather than the pulse duration, and therefore excellent range accuracy can still be obtained.

Useful optical chirp bandwidths have been achieved using wideband radio frequency (RF) electrical signals to modulate an optical carrier. Recent advances in chirped LIDAR include using the same modulated optical carrier as a reference signal that is combined with the returned signal at an optical detector to produce in the resulting electrical signal a relatively low beat frequency that is proportional to the difference in frequencies or phases between the references and returned optical signals. This kind of beat frequency detection of frequency differences at a detector is called heterodyne detection. It has several advantages known in the art, such as the advantage of using RF components of ready and inexpensive availability. Recent work described in U.S. Pat. No. 7,742,152 shows a novel simpler arrangement of optical components that uses, as the reference optical signal, an optical signal split from the transmitted optical signal. This arrangement is called homodyne detection in that patent.

LIDAR detection with phase encoded microwave signals modulated onto an optical carrier have been used as well. This technique relies on correlating a sequence of phases (or phase changes) of a particular frequency in a return signal with that in the transmitted signal. A time delay associated with a peak in correlation is related to range by the speed of light in the medium. Advantages of this technique include the need for fewer components, and the use of mass produced hardware components developed for phase encoded microwave and optical communications.

SUMMARY

The current inventors have recognized that changes are desirable in order to scan objects with a target spatial resolution in less time than current methods; and, that advances in this goal can be achieved by concentrating scanning by optical ranging systems within angular ranges associated with desired objects, called adaptive scanning. Techniques are provided for automatic or real-time adaptive scanning with a scanning laser ranging system.

In a first set of embodiments, a method includes determining a target spatial resolution for range measurements on an object at a target maximum range within view of a scanning laser ranging system and a coarse angular resolution for the system that causes the system to produce a coarse spatial resolution at the target maximum range, wherein the coarse spatial resolution is larger than the target spatial resolution. The method also includes operating the scanning laser ranging system to obtain a coarse plurality of range measurements in a first dimension at a coarse first dimension angular resolution based on the coarse angular resolution between a first dimension coarse start angle and a first dimension coarse stop angle and in a second dimension at a coarse second dimension angular resolution based on the coarse angular resolution between a coarse second dimension start angle and a coarse second dimension stop angle. Further, the method includes determining a first dimension sorted range gate subset of the coarse range measurements, wherein each range measurement in the range gate subset is greater than or equal to a subset minimum range and less than a subset maximum range. Still further, the method includes determining automatically a characteristic range between the subset minimum range and the subset maximum range based on the range gate subset. Yet further, the method includes determining automatically a fine first dimension angular resolution and a fine second dimension angular resolution based on the characteristic range and the target spatial resolution. Even further, if the fine first dimension angular resolution is finer than the coarse first dimension angular resolution or if the fine second dimension angular resolution is finer than the coarse second dimension angular resolution, then the method includes the following steps. A subset first dimension angular bin size is determining automatically based on the coarse first dimension angular resolution. A minimum second dimension angle and a maximum second dimension angle are determined automatically in each first dimension slice extending the subset first dimension angular bin size from any previous first dimension slice. A set of adaptive minimum second dimension angles and maximum second dimension angles are determined automatically by dilating and interpolating the minimum second dimension angles and maximum second dimension angles of all the slices to the fine first dimension angular resolution. Adaptive scanning properties are sent to the system, including sending the angular resolution, a first dimension start angle, a first dimension bin size and the set of adaptive minimum second dimension angles and maximum second dimension angles to cause the scanning laser ranging system to obtain range measurements at the fine first dimension angular resolution and at the fine second dimension angular resolution between the adaptive minimum second dimension angle and the adaptive maximum second dimension angle for each first dimension slice.

In some embodiments of the first set, a scan rate and local oscillator delay time for the scanning laser ranging system are determined automatically and the step of sending adaptive scanning properties further comprises sending the scan rate and the local oscillator delay time to the scanning laser ranging system.

In a second set of embodiments, a non-transitory computer-readable medium includes a first field holding data that indicates a range gate subset of observations from a scanning laser ranging system, wherein the subset of observations has ranges in an interval from a range gate minimum range to a range gate maximum range; and a plurality of records. Each record includes a first record field and a second record field. The first record field holds data that indicates a first dimension angle within a slice of the subset, wherein the slice of the subset has first dimension angles in a range from a slice minimum first dimension angle to a slice maximum first dimension angle. The second record field holds data that indicates an extreme value of second dimension angles in the slice, wherein an extreme value is either a maximum value of a set of values or a minimum value of the set of values. The records are ordered by value of content of the first record field.

In a third set of embodiments, a method of operating a scanning laser ranging system includes operating a scanning laser ranging system at a first reference path delay time to obtain a first range measurement. The method also includes determining whether the first reference path delay time is favorable for the first range measurement. If the first reference path delay time is not favorable for the first range measurement, then the method further includes determining a second reference path delay time that is favorable for the first range measurement; and, subsequently operating the scanning laser ranging system at the second reference path delay time to obtain a second range measurement.

In other embodiments, a system or apparatus or computer-readable medium is configured to perform one or more steps of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 6A is an image that illustrates example range gates for ranges to backscattered returns in an angled perspective view from FIG. 5, according to an embodiment;

FIG. 6B through FIG. 6E are masks in scanning angle space that show example returns in each of four range gates illustrated in FIG. 6A, according to an embodiment;

DETAILED DESCRIPTION

Figure 1A:
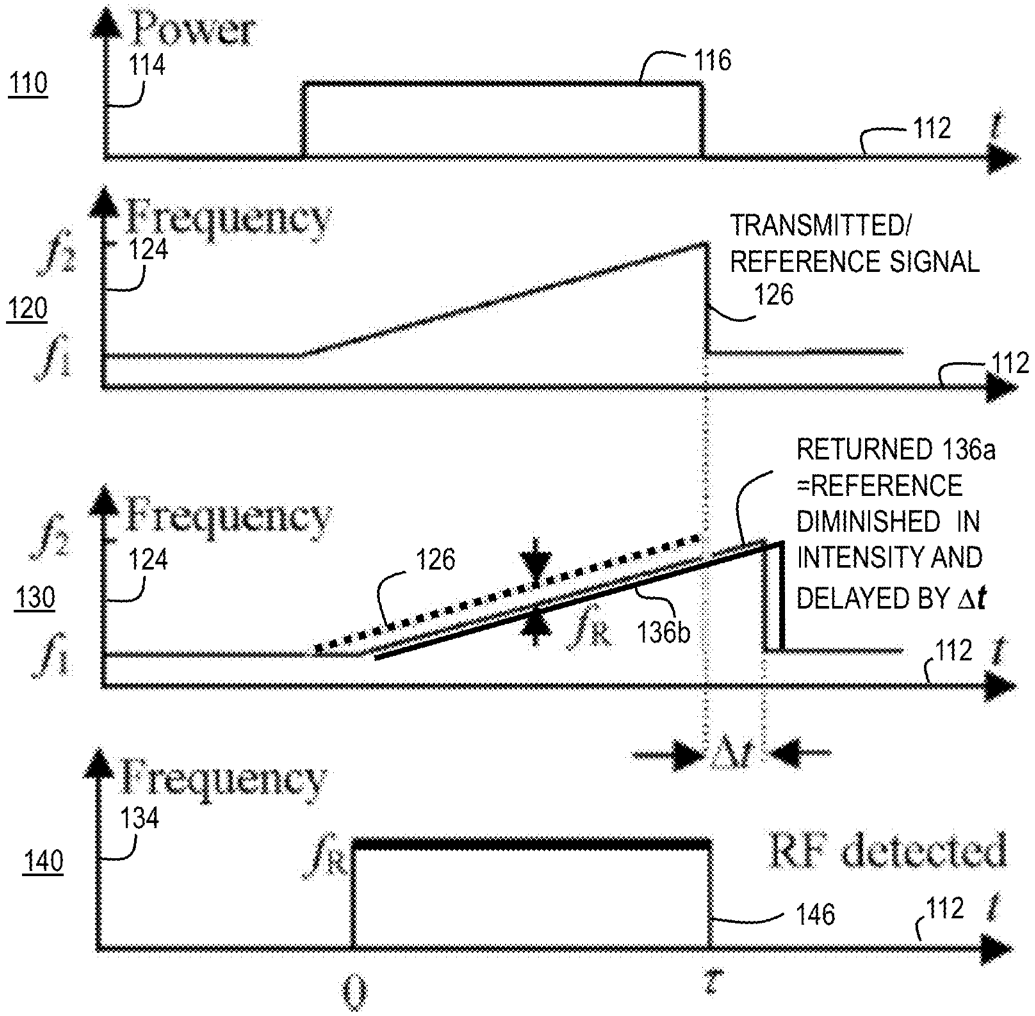
FIG. 1A is a set of graphs that illustrates an example optical chirp measurement of range, according to an embodiment.

A method and apparatus and system and computer-readable medium are described for adaptive scanning with laser range detection systems. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of a linear frequency modulated optical signal but frequency modulated optical signals need not be used. In other embodiments, amplitude pulsed or phase encoded optical signals are used. Embodiments are described in the context of a stationary scanning laser scanning over a limited horizontal angle sweep. In other embodiments, a moving laser range detection system is used with narrower or wider horizontal angular sweeps, including full 360 degree horizontal angular sweeps. Many embodiments are described in terms of a vertical saw-tooth scan trajectory. However, in other embodiments, a vertical column-order scan trajectory, or horizontal row-order scan trajectory, or horizontal saw-toothed scan trajectory, or some combination, are used. For example, the vertical saw tooth projection was used with an embodiment having a hardware configuration with a rotation stage for horizontal motion (slow) and a galvanometer scan mirror for vertical (fast). Another embodiment uses a 2-axis fast steering mirror (fast scanning in two dimensions, limited FOV) or a 2-axis pan tilt unit (slower motion in 2 dimensions, huge FOV), or some combination.

1. CHIRPED DETECTION OVERVIEW

FIG. 1A is a set of graphs 110, 120, 130, 140 that illustrates an example optical chirp measurement of range, according to an embodiment. The horizontal axis 112 is the same for all four graphs and indicates time in arbitrary units, on the order of milliseconds (ms, 1 ms=$10^{-3}$ seconds). Graph 110 indicates the power of a beam of light used as a transmitted optical signal. The vertical axis 114 in graph 110 indicates power of the transmitted signal in arbitrary units. Trace 116 indicates that the power is on for a limited pulse duration, $\tau$ starting at time 0. Graph 120 indicates the frequency of the transmitted signal. The vertical axis 124 indicates the frequency transmitted in arbitrary units. The trace 126 indicates that the frequency of the pulse increases from $f_1$ to $f_2$ over the duration $\tau$ of the pulse, and thus has a bandwidth $B=f_2-f_1$. The frequency rate of change is $(f_2-f_1)/\tau$.

The returned signal is depicted in graph 130 which has a horizontal axis 112 that indicates time and a vertical axis 124 that indicates frequency as in graph 120. The chirp 126 of graph 120 is also plotted as a dotted line on graph 130. A first returned signal is given by trace 136*a*, which is just the transmitted reference signal diminished in intensity (not shown) and delayed by $\Delta\tau$. When the returned signal is received from an external object after covering a distance of 2R, where R is the range to the target, the returned signal starts at the delayed time $\Delta\tau$ given by 2R/c, were c is the speed of light in the medium (approximately $3\times10^8$ meters per second, m/s). Over this time, the frequency has changed by an amount that depends on the range, called $f_R$, and given by the frequency rate of change multiplied by the delayed time. This is given by Equation 1a.

$$f_R=(f_2-f_1)/\tau*2R/c=2BR/c\tau \tag{1a}$$

The value of $f_R$ is measured by the frequency difference between the transmitted signal 126 and returned signal 136*a* in a time domain mixing operation referred to as dechirping. So the range R is given by Equation 1b.

$$R=f_Rc\tau/2B \tag{1b}$$

Of course, if the returned signal arrives after the pulse is completely transmitted, that is, if 2R/c is greater than $\tau$, then Equations 1a and 1b are not valid. In this case, the reference signal, also called a local oscillator (LO), is delayed a known or fixed amount to ensure the returned signal overlaps the reference signal. The fixed or known delay time, $\Delta t_{LO}$, of the reference signal is multiplied by the speed of light, c, to give an additional range that is added to range computed from Equation 1b. While the absolute range may be off due to uncertainty of the speed of light in the medium, this is a near-constant error and the relative ranges based on the frequency difference are still very precise.

In some circumstances, a spot illuminated by the transmitted light beam encounters two or more different scatterers at different ranges, such as a front and a back of a semitransparent object, or the closer and farther portions of an object at varying distances from the LIDAR, or two separate objects within the illuminated spot. In such circumstances, a second diminished intensity and differently delayed signal will also be received, indicated in graph 130 by trace 136*b*. This will have a different measured value of $f_R$ that gives a different range using Equation 1b. In some circumstances, multiple returned signals are received.

Graph 140 depicts the difference frequency $f_R$ between a first returned signal 136*a* and the reference chirp 126. The horizontal axis 112 indicates time as in all the other aligned graphs in FIG. 1A, and the vertical axis 134 indicates frequency difference on a much expanded scale. Trace 146 depicts the constant frequency $f_R$ measured during the transmitted, or reference, chirp, which indicates a particular range as given by Equation 1b. The second returned signal 136*b*, if present, would give rise to a different, larger value of $f_R$ (not shown) during de-chirping; and, as a consequence yield a larger range using Equation 1b.

A common method for de-chirping is to direct both the reference optical signal and the returned optical signal to the same optical detector. The electrical output of the detector is dominated by a beat frequency that is equal to, or otherwise depends on, the difference in the frequencies, phases and amplitudes of the two signals converging on the detector. A Fourier transform of this electrical output signal will yield a peak at the beat frequency. This beat frequency is in the radio frequency (RF) range of Megahertz (MHz, 1 MHZ=$10^6$ Hertz=$10^6$ cycles per second) rather than in the optical frequency range of Terahertz (THz, 1 THz=$10^{12}$ Hertz). Such signals are readily processed by common and inexpensive RF components, such as a Fast Fourier Transform (FFT) algorithm running on a microprocessor or a specially built FFT or other digital signal processing (DSP) integrated circuit. In other embodiments, the return signal is mixed with a continuous wave (CW) tone acting as the local oscillator (versus a chirp as the local oscillator). This leads to the detected signal which itself is a chirp (or whatever waveform was transmitted). In this case the detected signal would undergo matched filtering in the digital domain as described in Kachelmyer 1990. The disadvantage is that the digitizer bandwidth requirement is generally higher. The positive aspects of coherent detection are otherwise retained.

Figure 1B:
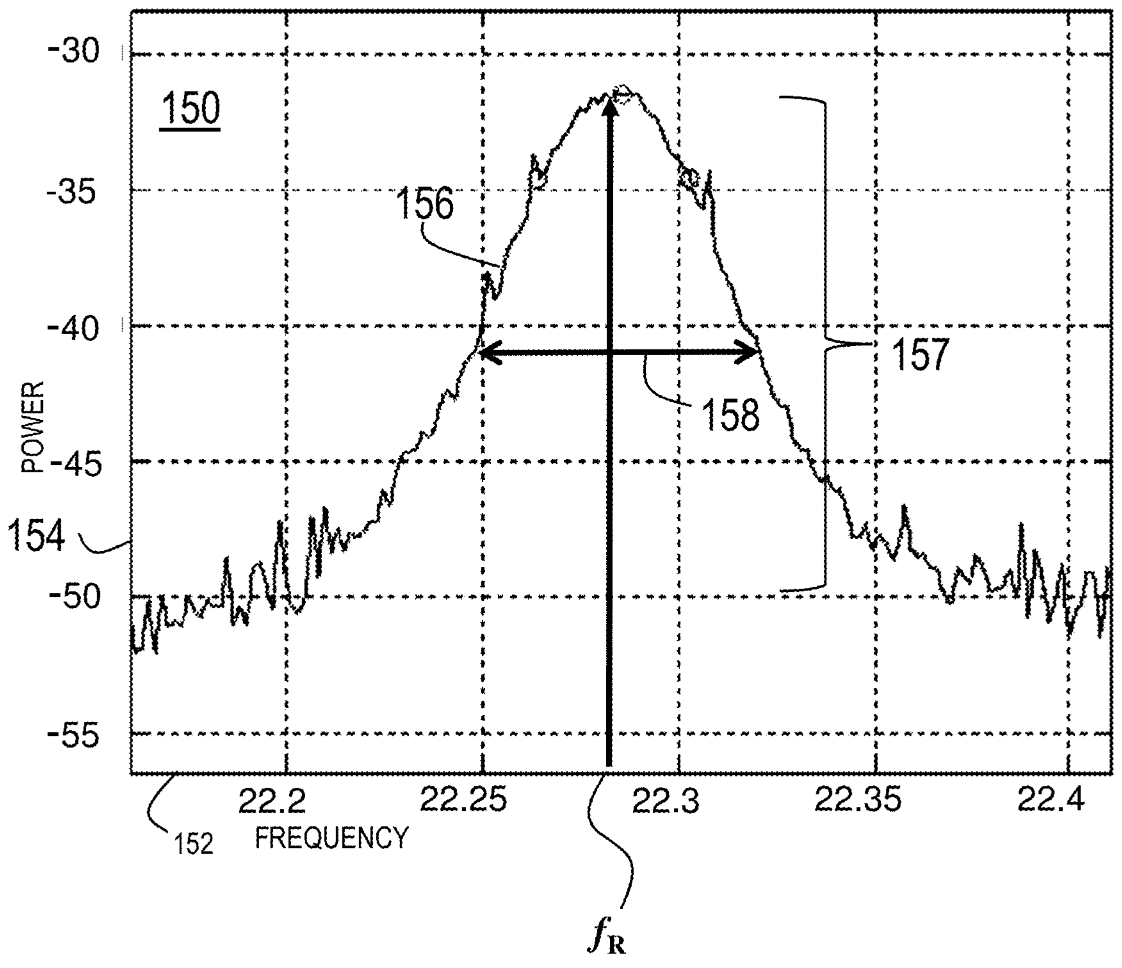
FIG. 1B is a graph that illustrates an example measurement of a beat frequency resulting from de-chirping, which indicates range, according to an embodiment.

FIG. 1B is a graph that illustrates an example measurement of a beat frequency resulting from de-chirping, which indicates range, according to an embodiment. The horizontal axis 152 indicates frequency in Megahertz; and the vertical axis indicates returned signal power density $I_R$ relative to transmitted power density $I_T$ in decibels (dB, Power in dB=20 log($I_R/I_T$)). Trace 156 is the Fourier transform of the electrical signal output by the optical detector, such as produced by a FFT circuit; and, the data plotted is based on data published by Adany et al., 2009. The horizontal location of the peak gives $f_R$ that indicates the range, using Equation 1b. In addition, other characteristics of the peak can be used to describe the returned signal. For example, the power value at the peak is characterized by the maximum value of trace 156, or, more usually, by the difference 157 (about 19 dB in FIG. 1B) between the peak value (about −31 dB in FIG. 1B) and a noise floor (about −50 dB in FIG. 1B) at the shoulders of the peak; and, the width of the peak is characterized by the frequency width 158 (about 0.08 MHz in FIG. 1B) at half maximum (FWHM). If there are multiple discernable returns, there will be multiple peaks in the FFT of the electrical output of the optical detector, likely with multiple different power levels and widths. Any method may be used to automatically identify peaks in traces, and characterize those peaks by location, height and width. For example, in some embodiments, FFTW or Peak detection by MATLAB—Signal Processing Toolbox is used, available from MTLAB™ of MATHWORKS™ of Natick, Massachusetts. One can also use custom implementations that rely on FFTW in CUDA and custom peak detection in CUDA™ available from NVIDIA™ of Santa Clara, California. Custom implementations have been programmed on field programmable gate arrays (FPGAs). A commonly used algorithm is to threshold the range profile and run a center of mass algorithm, peak fitting algorithm (3-point Gaussian fit), or nonlinear fit of the peak for some function (such as a Gaussian) to determine the location of the peak more precisely.

A new independent measurement is made at a different angle, or translated position of a moving LIDAR system, using a different pulse after an interlude of ti, so that the pulse rate (PR) is given by the expression 1/(τ+ti). A frame is a 2 dimensional image of ranges in which each pixel of the image indicates a range to a different portion of an object viewed by the transmitted beam. For a frame assembled from transmitted signals at each of 1000 horizontal angles by 1000 vertical angles, the frame includes $10^6$ pixels and the frame rate (FR) is $10^{-6}$ of the pulse rate, e.g., is $10^{-6}/(\tau+ti)$.

2. CHIRPED DETECTION HARDWARE OVERVIEW

Figure 2A:
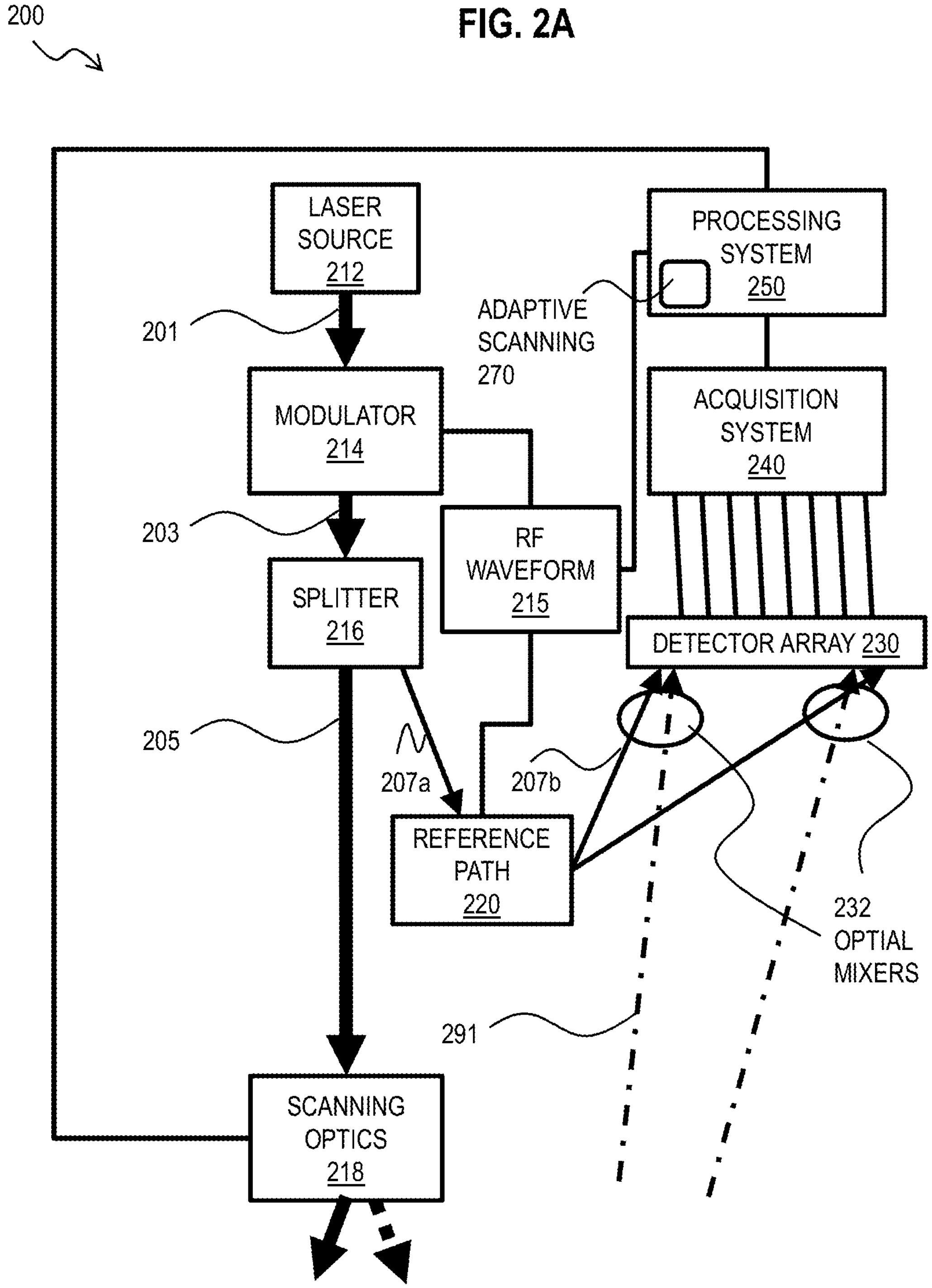
FIG. 2A and FIG. 2B are block diagrams that illustrate example components of a high resolution LIDAR system, according to various embodiments.
Figure 2B:
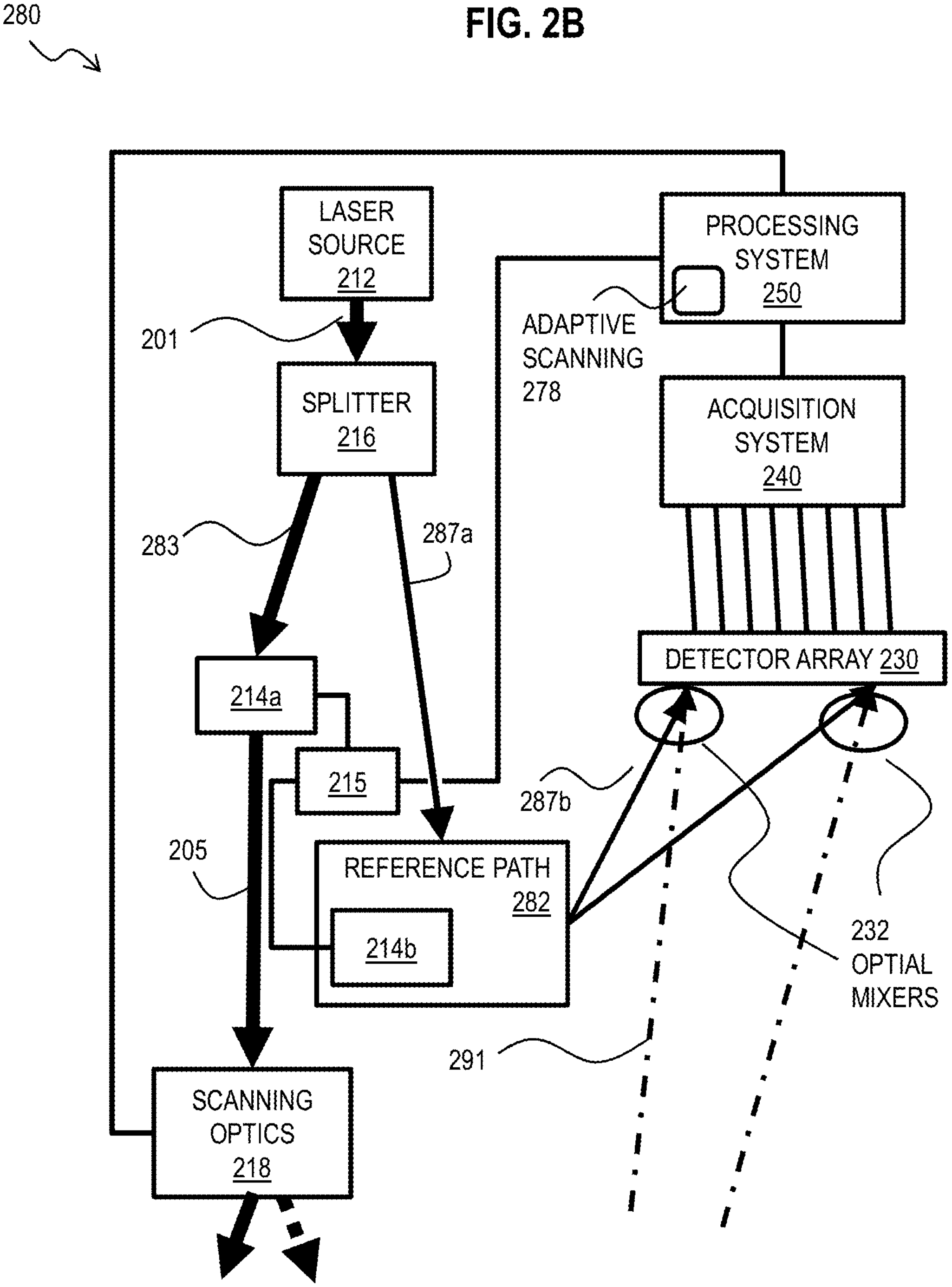

In order to depict how the range detection approach is implemented, some generic hardware approaches are described. FIG. 2A and FIG. 2B are block diagrams that illustrate example components of a high resolution LIDAR system, according to various embodiments. In FIG. 2A, a laser source 212 emits a carrier wave 201 that is amplitude or frequency or phase modulated, or some combination, in the modulator 214 based on input from a RF waveform generator 215 to produce an optical signal 203 with a pulse that has a bandwidth B and a duration τ. In some embodiments, the RF waveform generator 215 is software controlled with commands from processing system 250. A splitter 216 splits the modulated optical waveform into a transmitted signal 205 with most of the energy of the optical signal 203 and a reference signal 207 with a much smaller amount of energy that is nonetheless enough to produce good heterodyne or homodyne interference with the returned light 291 scattered from a target (not shown). In some embodiments, the transmitted beam is scanned over multiple angles to profile any object in its path using scanning optics 218. The reference signal is delayed in a reference path 220 sufficiently to arrive at the detector array 230 with the scattered light. In some embodiments, the splitter 216 is upstream of the modulator 214, and the reference beam 207 is unmodulated. In some embodiments, the reference signal is independently generated using a new laser (not shown) and separately modulated using a separate modulator (not shown) in the reference path 220 and the RF waveform from generator 215. In some embodiments, as described below with reference to FIG. 2B, the output from the single laser source 212 is independently modulated in reference path 220. In various embodiments, from less to more flexible approaches, the reference is caused to arrive with the scattered or reflected field by: 1) putting a mirror in the scene to reflect a portion of the transmit beam back at the detector array so that path lengths are well matched; 2) using a fiber delay to closely match the path length and broadcast the reference beam with optics near the detector array, as suggested in FIG. 2A, with or without a path length adjustment to compensate for the phase difference observed or expected for a particular range; or, 3) using a frequency shifting device (acousto-optic modulator) or time delay of a local oscillator waveform modulation to produce a separate modulation to compensate for path length mismatch; or some combination, as described in more detail below with reference to FIG. 2B. In some embodiments, the target is close enough and the pulse duration long enough that the returns sufficiently overlap the reference signal without a delay. In some embodiments, the reference signal 207*b* is optically mixed with the return signal 291 at one or more optical mixers 232. In various embodiments, multiple portions of the target scatter a respective returned light 291 signal back to the detector array 230 for each scanned beam resulting in a point cloud based on the multiple ranges of the respective multiple portions of the target illuminated by multiple beams and multiple returns.

The detector array 230 is a single or balanced pair optical detector or a 1D or 2D array of such optical detectors arranged in a plane roughly perpendicular to returned beams 291 from the target. The phase or amplitude of the interface pattern, or some combination, is recorded by acquisition system 240 for each detector at multiple times during the pulse duration □. The number of temporal samples per pulse duration affects the down-range extent. The number is often a practical consideration chosen based on pulse repetition rate and available camera frame rate. The frame rate is the sampling bandwidth, often called "digitizer frequency." Basically, if X number of detector array frames are collected during a pulse with resolution bins of Y range width, then a X*Y range extent can be observed. The acquired data is made available to a processing system 250, such as a computer system described below with reference to FIG. 8, or a chip set described below with reference to FIG. 9. In some embodiments, the acquired data is a point cloud based on the multiple ranges of the respective multiple portions of the target.

An adaptive scanning module 270 determines whether non-uniform scanning by scanning optics is desirable for a particular scene being scanned, as described in more detail below. For example, the adaptive scanning module 270 determines what scanning angles and resolutions to use for different portions of a scene, so that the valuable pulses for constructing a frame, e.g., the millions of beams transmitted during a few seconds, are concentrated in directions where there are returns from objects to be scanned and avoid directions where there is only sky or nearby ground of little interest. In some embodiments, the adaptive scanning module 270 controls the RF waveform generator 215.

FIG. 2B depicts an alternative hardware arrangement that allows software controlled delays to be introduced into the reference path that produces the reference signal, also called the local oscillator (LO) signal. The laser source 212, splitter 216, transmit signal 205, scanning optics 218, optical mixers 232, detector array 230, acquisition system 240 and processing system 250 are as described above with reference to FIG. 2A. In FIG. 2B, there are two separate optical modulators, 214*a* in the transmit path and 214*b* in the reference path to impose an RF waveform from generator 215 onto an optical carrier. The splitter 216 is moved between the laser source 212 and the modulators 214*a* and 214*b* to produce optical signal 283 that impinges on modulator 214*a* and lower amplitude reference path signal 287*a* that impinges on modulator 214*b* in a revised reference path 282. In this embodiment, the light 201 is split into a transmit (TX) path beam 283 and reference/local oscillator (LO) path beam 287*a* before the modulation occurs; and, separate modulators are used in each path. With the dual modulator approach, either path can be programmed with chirps at offset starting frequencies and/or offset starting times. This can be used to allow the adaptive scanning approach to be adaptive in the down-range dimension. By shifting the delay used in each range gate, the system can unambiguously measure with high resolution despite other systems limitations (detector and digitizer bandwidth, measurement time, etc.). Thus, in some embodiments, a revised adaptive scanning module 278 controls the RF waveform generator to impose the delay time appropriate for each range gate produced by the adaptive scanning described below. The software controlled delay reference signal 287*b* is then mixed with the return signals 291, as described above. In other embodiments, the software controlled delay of the LO reference path 282 allows the system 280 to garner range delay effects for chirp Doppler compensation as well.

For example, in some chirp embodiments, the laser used was actively linearized with the modulation applied to the current driving the laser. Experiments were also performed with electro-optic modulators providing the modulation. The system is configured to produce a chirp of bandwidth B and duration $\tau$, suitable for the down-range resolution desired, as described in more detail below for various embodiments. This technique will work for chirp bandwidths from 10 MHz to 5 THz. However, for 3D imaging applications, typical ranges are chirp bandwidths from about 300 MHz to about 20 GHz, chirp durations from about 250 nanoseconds (ns, ns=$10^{-9}$ seconds) to about 1 millisecond (ms, 1 ms=$10^{-3}$ seconds), ranges to targets from about 0 meters to about 20 kilometers (km, 1 km=$10^{3}$ meters), spot sizes at target from about 3 millimeters (mm, 1 mm=$10^{-3}$ meters) to about 1 meter (m), depth resolutions at target from about 7.5 mm to about 0.5 m. In some embodiments, the target has a minimum range, such as 400 meters (m). It is noted that the range window can be made to extend to several kilometers under these conditions. Although processes, equipment, and data structures are depicted in FIG. 2A and FIG. 2B as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. For example splitter 216 and reference path 220 include zero or more optical couplers.

3. ADAPTIVE SCANNING OVERVIEW

Figure 3A:
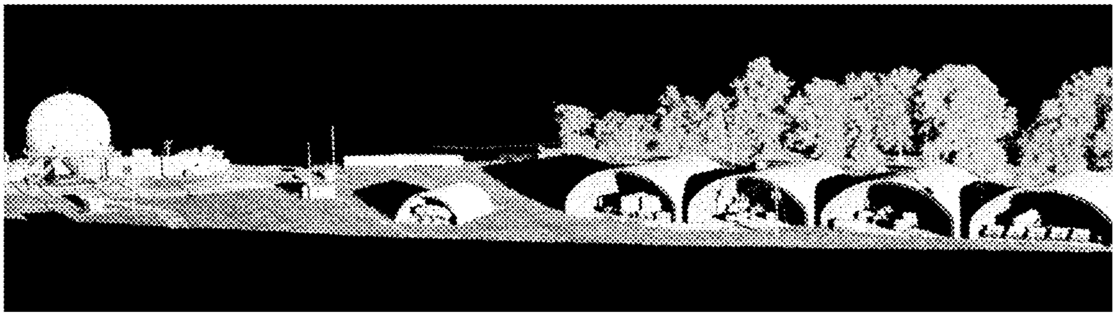
FIG. 3A is an image that illustrates an example scene to be scanned with a scanning laser ranging system, according to an embodiment.
Figure 3B:
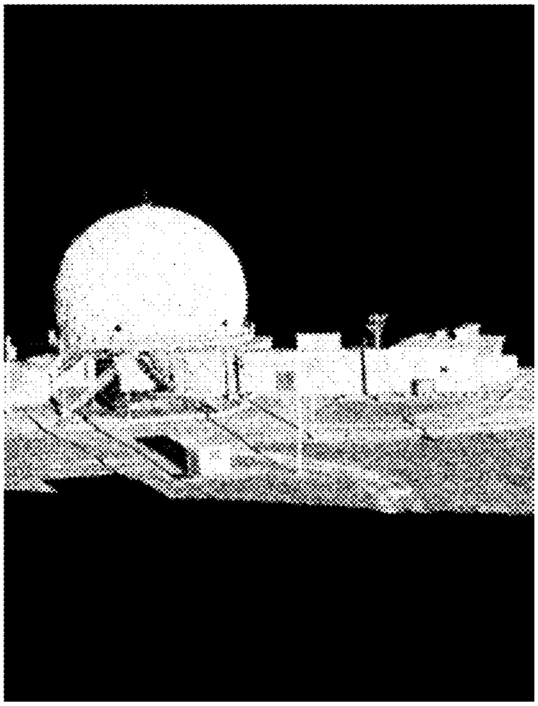
FIG. 3B is an image that illustrates an example horizontal portion of the scene in FIG. 3A to be adaptively scanned, according to an embodiment.

FIG. 3A is an image that illustrates an example scene to be scanned with a scanning laser ranging system, according to an embodiment. This image was produced using maximum horizontal and vertical angular resolution of a scanning 3D laser ranging system configured for ranges of up to about 1 kilometer (e.g., 0.5 to 2 km) with about 10 centimeter range resolution (e.g., 5 to 20 cm). FIG. 3B is an image that illustrates an example horizontal portion of the scene in FIG. 3A to be adaptively scanned, according to an embodiment. The horizontal dimension indicates horizontal angle in relative units and the vertical dimension indicates vertical angle in relative units as viewed from a stationary LIDAR system. The adaptive scanning is undertaken to speed the collection of desired ranging information by avoiding measurements at angles of no return; by using high angular resolution sampling only for the more distant targets where such sampling is desirable to obtain a target spatial resolution; and by using lower angular resolution sampling at closer objects where the lower angular resolution suffices to provide the target spatial resolution.

Figure 3C:
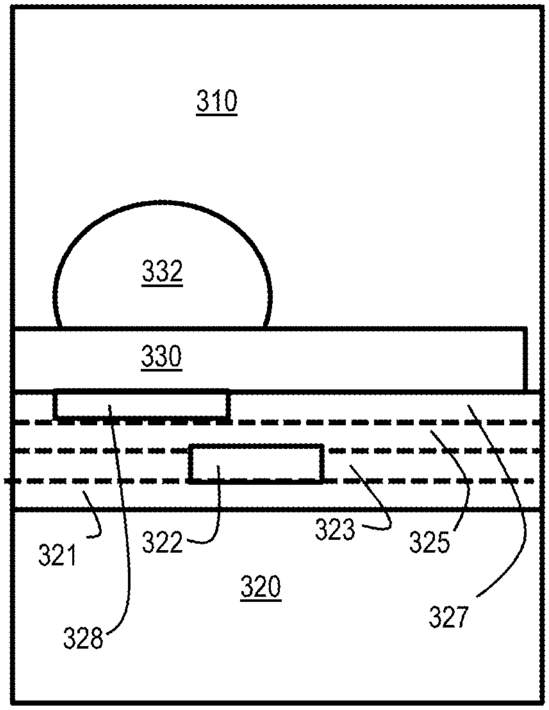
FIG. 3C is a block diagram that illustrates example sets or areas in angle space for features evident in FIG. 3B, according to an embodiment.

The advantages of adaptive scanning are illustrated in FIG. 3C. FIG. 3C is a block diagram that illustrates example sets of ranges for features evident in FIG. 3B, according to an embodiment. FIG. 3C represents sampling angle space. In area 310, there are no returns and it is desirable not to scan this area of angle space. In area 320 there is only the ground immediately in front of the system of little interest (e.g., the area is well understood or includes only small features of no particular interest). It is desirable not to scan this area of angle space either. The distant domed structure occupies area 332 of angle space, the structures in front of the dome occupy area 330 of angle space, a wall or fence in front of these occupies area 328 of angle space, and a closer structure and pole occupies area 322 of angle space. Between area 320 of no interest and the structures in area 330, the terrain is evident at ever increasing ranges marked as areas 321, 323, 325 and 327 in angle space. To identify scene features with at least a target spatial resolution, s, say 10 centimeters, the angular resolution, Δθ to use is a function of range R to an object, as given by Equation 2.

$$\Delta\theta = \arctan(s/\mathrm{R}) \tag{2a}$$

For small values of the ratio s/R, Δθ≈s/R. In most circumstances, s is much smaller than R and the approximation Δθ=s/R is used to speed processing in many embodiments. To ensure that at least the target spatial resolution, s, or better is achieved for all objects in a range interval from a near range Rnear to a far range Rfar, the far range is used in Equation 2a to give Equation 2b.

$$\Delta\theta = \arctan(s/Rfar) \tag{2b}$$

When the small angle approximation is valid, Equation 2b reduces to Equation 2c.

$$\Delta\theta = s/Rfar \tag{2c}$$

Of course, any given laser ranging system has a minimum angular width of an individual optical beam, and an angular resolution cannot practically be defined that is much smaller than such an angular beam width. Thus at some large ranges the target spatial resolution, s, may not be achievable. For simplicity in the following description, it is assumed that the computed Δθ is always greater than the beam angular width.

Figure 3D:
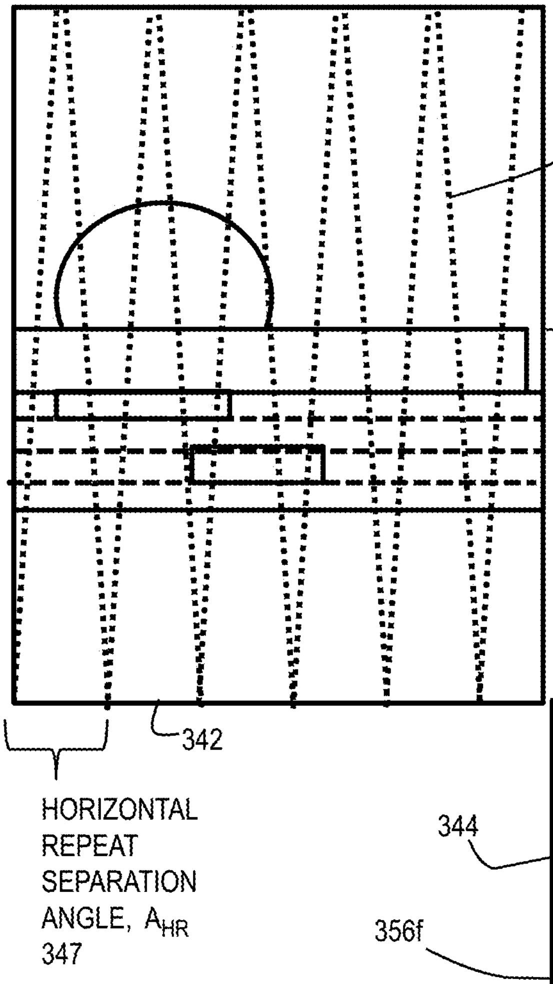
FIG. 3D is a block diagram that illustrates example coarse angular scanning over the features depicted in FIG. 3D, according to an embodiment.

Equations 2a through 2c imply that the ranges to various objects in the scene are known. According to various embodiments, the ranges involved in the scene are determined by a first-pass, coarse, angular resolution. It is common for ranges in a scene to extend further in one dimension than the other, or for the apparatus to have greater control in one dimension compared to the other; so, in some embodiments, the coarse horizontal angular resolution is different from the course vertical angular resolution. FIG. 3D is a block diagram that illustrates example coarse angular scanning over the features depicted in FIG. 3C, according to an embodiment. The horizontal axis 342 indicates horizontal angle (also called azimuth) and the vertical axis indicates vertical angle (also called elevation). A vertical saw-tooth scan trajectory is indicated by dotted line 346. For purposes of illustration, it is assumed that the path is followed by the scanning optics from lower left to upper right. The scan trajectory 346 is a vertical saw-tooth pattern with a horizontal repeat separation angle 347, designated $A_{HR}$. The scan trajectory 346 is widely spaced in the horizontal compared to the finest horizontal scanning that could be performed by a scanning LIDAR ranging system. In addition, range measurements are taken along the path 346 at the coarse vertical sampling resolution. Thus, the measurements along scan trajectory 346 can be obtained in a short time compared to a target frame rate. The horizontal resolution is variable but is characterized by two samples per horizontal repeat separation, $A_{HR}$; thus, the average horizontal resolution is $A_{HR}/2$. In other embodiments a row-order or column-order scan trajectory is used in which both the horizontal samples separation and the vertical samples separation are constant over the scan. In some of these embodiments, both the horizontal and vertical separations are set to Δθ.

As a result of the coarse scanning, a variety of ranges, R(α, ε) where α is the horizontal (azimuthal) scan angle and ε is the vertical (elevation) scan angle, are available for all horizontal angles from a coarse minimum horizontal angle, α min, to a coarse maximum horizontal angle, αmax, and a coarse minimum vertical angle, εmin, to a coarse maximum vertical angle, εmax; thus, forming a point cloud. Ranges in area 320 are excluded. The remaining ranges are divided into multiple range intervals, called range gates, each range gate defined by a different, non-overlapping interval given by a different, non-overlapping Rnear and Rfar. If a range R(α, ε) is a member of range gate number n, a set designated RGn, of N range gates, then it satisfies Equation 3.

$$Rnear_n \le RGn < Rfar_n \tag{3}$$

The values $\mathrm{Rnear}_n$ can be used as gates for assigning a range R(α, ε) and its associated angular coordinates (α, ε) to one range gate set, using instructions such as $$\text{For } [[\square]]\underline{\alpha} = [[\square]]\underline{\alpha}\text{min to } [[\square]]\underline{\alpha}\text{max}, [[\square]]\underline{\varepsilon} = [[\square]]\underline{\varepsilon}\text{min to } [[\square]]\underline{\varepsilon}\text{max}$$

$$n = 0$$

$$\text{for } i = 1 \text{ to } N, \text{ if } R([[\square, \square]]\underline{\alpha, \varepsilon}) \ge Rnear_i, \text{ then } n = i$$

$$\text{add } R([[\square, \square]]\underline{\alpha, \varepsilon}) \text{ to set } RGn$$

Figure 3E:
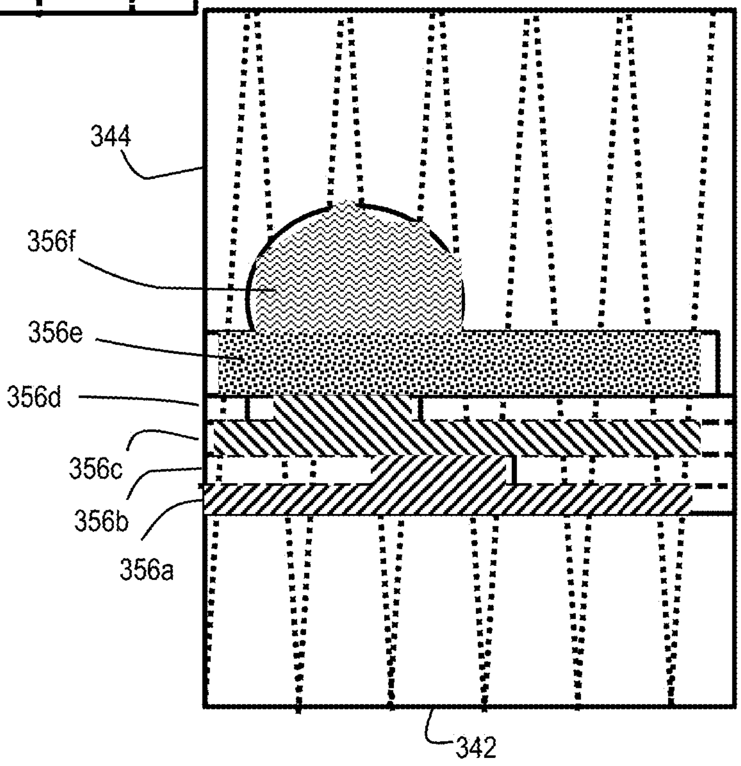
FIG. 3E is a block diagram that illustrates example contiguous areas of scanned ranges in angular scan space within a block of ranges for a range gate over the features depicted in FIG. 3D, according to an embodiment.

Each portion of the angular space, made up of all the angular coordinates (α, ε) in the range gate set, can then be associated with one of the range gates. The area associated with each range gate is called a range gate area. FIG. 3E is a block diagram that illustrates example contiguous areas of scanned ranges in angular scan space within a block of ranges for a range gate over the features depicted in FIG. 3D, according to an embodiment. The area **356*a* is assigned to RG1 that includes the near building and pole area 322; the area 356*b* is assigned to RG2, the area 356*c* is assigned to RG3 that includes the wall structure area 328, the area 356*d* is assigned to RG4, the area 356*e* is assigned to RG5 that includes the buildings area 330, and the area 356*f* is assigned to RG6 that includes the domed structure 332**.

In various embodiments, the horizontal or vertical resolution or both is adjusted in the angular space areas associated with each range gate n to satisfy Equation 2b or Equation 2c, where Rfar is given by $\mathrm{Rfar}_n$. In some embodiments, each range gate area is outlined by a minimum vertical angle for each horizontal angle and a maximum vertical angle for each horizontal angle based on the coarse sampling. Each of the minimum vertical angles and maximum vertical angles are interpolated to the target horizontal angular spacing (a spacing given by Equation 2b where Rfar is given by $\mathrm{Rfar}_n$). Then, each range gate area is scanned separately with a saw-toothed scanning pattern (or other scanning pattern) using horizontal and vertical angular resolution given by Equation 2b where Rfar is given by $Rfar_n$. A scanning pattern is also called a scan trajectory.

Figure 4:
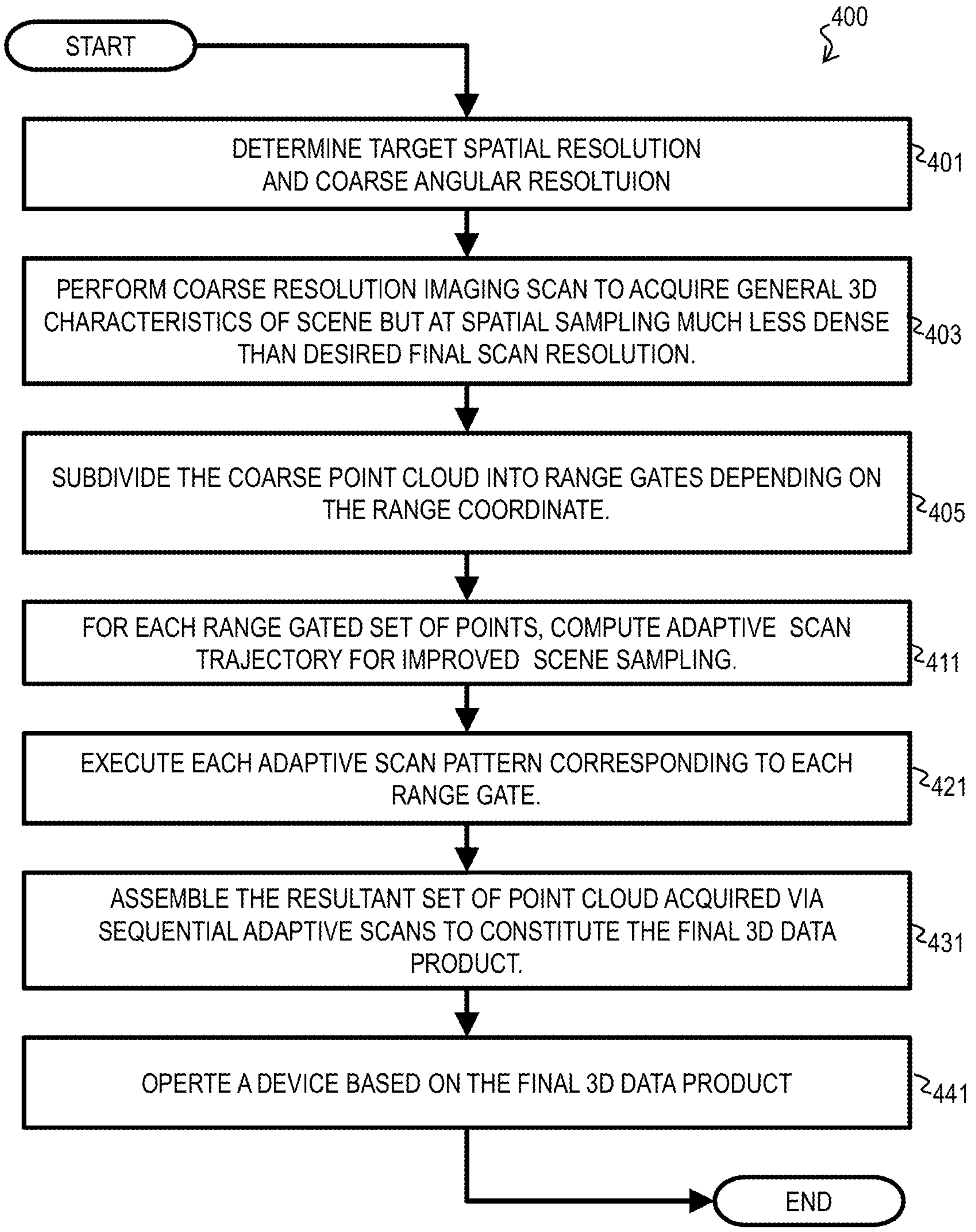
FIG. 4 is a flow chart that illustrates an example method for adaptive scanning with a scanning laser ranging system, according to an embodiment.

FIG. 4 is a flow chart that illustrates an example method for adaptive scanning with a scanning laser ranging system, according to an embodiment. Although steps are depicted in FIG. 4, and in subsequent flowchart FIG. 14, as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 401, a target spatial resolution, s, is determined. Any method can be used. This can be input manually by a user or retrieved from storage on a computer-readable medium or received from a local or remote database or server, either unsolicited or in response to a query. In some embodiments, a size range for objects, Os, of interest is input and the target spatial resolution, s, is determined based on a predetermined or specified fraction, such as one hundredth or one thousandth, of an indicated object size, Os. In some embodiments, in step 401, a maximum range, Rmax, for detecting such objects is also determined using one or more of the above methods. In some embodiments the coarse angular resolution is also provided, using any of the above methods. In some embodiments, the coarse angular resolution is determined based on one or more other inputs. For example, if the desired target spatial resolution is s and the greatest range of interest is Rmax, then the finest angular resolution, Δθbest, is given by Equation 2a with R replaced by Rmax. In this case, the coarse angular resolution is a multiple of this finest resolution, Δθbest. In order to complete this coarse scan in a small amount of time compared to a frame rate, the multiple is large, e.g., in a range from about 10 to about 100 times the finest resolution (completing a coarse frame in one 100th to one $10{,}000^{th}$ of a high resolution frame). The spatial resolution that is specified will depend on the application (surveying may have different requirements from those for 3D shape detection, for example). In various experimental embodiments, spatial resolution on target is about 1 cm or more with 10 cm on target considered to be rather large final resolution for the experimental imager. The multiple used for coarse scan resolution is between about 10 to about 25 times the fine resolution on target. The coarse scan will still then be a fraction of the total scan time but will provide good information for adaptive scan pattern generation.

In step 403, a coarse resolution imaging scan is performed to acquire general 3D characteristics of scene but at spatial sampling much less dense than a desired final scan angular resolution. The result of this coarse scan is a coarse three dimensional (3D) point cloud, each point in the cloud indicating a location in 3D coordinates of an illuminated spot on a laser backscattering surface. The 3D coordinates may be polar coordinates, such as azimuth α, elevation ε, and range R from the ranging system, or Cartesian coordinates, such as x horizontal (e.g., distance north from some reference point, e.g., the location of the ranging system), y horizontal (e.g., distance east from the reference point), and z (e.g., altitude above the horizontal plane).

In step 405, the coarse point cloud is subdivided into range gates depending on the range coordinate, e.g., using Equation 3, above, and the pseudo code immediately following Equation 3 . . . . Subdivision may be hard coded with N fixed values of $Rnear_n$ or adaptive based on one to N computed values for the $Rnear_n$. For example, in some embodiments, the $5^{st}$ and $99^{th}$ percentile ranges, $R_5$ and $R_{99}$, respectively, are determined from the distribution of ranges in the coarse 3D point cloud; and, the number N of range gates is determined based on the difference between the $99^{th}$ percentile range and the $5^{th}$ percentile ranges and the object sizes of interest (e.g., N=modulus(.$R_{99}$-$R_5$, M*Os) where Os is the object size of objects of interest and M is a multiple greater than 1, such as M=4. In this adaptive example, the N range gates are evenly distributed between $R_5$ and $R_{99}$. In some embodiments, step 405 includes converting a Cartesian representation of the acquired coarse point cloud data to spherical coordinates relative to the LIDAR ranging system before determining the range gates. In other embodiments, determining the N rage gates was done through basic data analysis of the point density as a function of range. An example adaptive data analysis placed range gates at ranges in the density distribution the where there was a minimal number of points. This was done so that range gate "seams" are placed where there is a minimum density of objects visible to the system.

In step 411, for each range gated set of points, RGn, an adaptive scan trajectory is determined for improved scene sampling. To ensure that every object in the set RGn is resolved at or near target spatial resolution, s, a characteristic range in the range gate is used, in place of Rfar, with Equation 2b or Equation 2c, to determine angular resolution for vertical and horizontal scan properties. For example, to ensure that every object in the range gate is sampled at least at the target spatial resolution, s, the characteristic range is $Rfar_n$; and, Equation 2b or Equation 2c is used. In some embodiments, the horizontal repeat separation angle, $A_{HR}$, of the saw-tooth pattern is set to the angular resolution Δθ so that the worst horizontal resolution is Δθ and the average horizontal resolution is even better at Δθ/2. In some embodiments, where an average spatial resolution, s, is acceptable $A_{HR}$ is set to 2Δθ, because the average horizontal resolution is then Δθ. However, in other embodiments, other characteristic ranges are used, such as the middle range, $Rmid_n$, defined to be halfway between $Rnear_n$ and $Rfar_n$. Thus, the adaptive scan trajectory is determined between the minimum vertical angle and the maximum vertical angle at all horizontal angles in the range gate area in angle space.

In some embodiments, a delay time for the local oscillator, $\Delta t_{LOn}$, is determined for each range gate sampling trajectory for range gate n using a range gate range, RGRn, of the nth range gate, RGn, e.g., RGRn equals or is a function of $Rnear_n$ or of a characteristic range as defined above, according to Equation 4.

$$\Delta t_{LOn} = RGRn/c \tag{4}$$

In some embodiments, the characteristic range is adaptively determined based on the observations. For example, the far range, $Rfar_n$, or the middle range, $Rmid_n$, may be a range that rarely occurs; and, another range is much more likely or much more common. Thus, in some embodiments, the characteristic range is determined to be a mean range, $Rmean_n$, a root mean square range, $Rrms_n$, a median range, $Rmed_n$, or mode (peak) range, $Rpeak_n$, of the coarsely sampled ranges observed in the range gate set RGn. Then the chosen characteristic range is used as the range R in Equation 2a, or in place of Rfar in Equation 2c, to determine the angular resolution Δθ and the adaptive scan trajectory between the minimum vertical angle and the maximum vertical angle at all horizontal angles in the range gate area in angle space.

In some embodiments, the reference path delay time $\Delta t_{LO}$, is modified from one pulse to the next pulse in the scanning pattern, even without range gating. This is advantageous under the assumption that a next or nearby pulse is likely to be at or close to the range determined from a current pulse. For example, in some embodiments, a scanning laser ranging system is operated at a first reference path delay time to obtain a first range measurement. It is determined whether the first reference path delay time is favorable for the first range measurement. If the first reference path delay time is not favorable for the first range measurement, then a second reference path delay time is determined, which is favorable for the first range measurement. Then, the scanning laser ranging system is operated at the second reference path delay time, at least on one subsequent pulse, to obtain a second range measurement.

In some embodiments, the pulse duration $\tau$ and interval period ti are also determined for the laser ranging system during step 411 so that a minimum frame rate can be maintained. In such embodiments, a target frame rate, e.g., 4 frames per second, is set and the number of range measurements in the trajectories for all the range gates that are needed for the target spatial resolution determines the time per range measurements. This time per measurement then determines the sum of the pulse duration $\tau$ and interval between pulses, ti. This pulse duration then determines the delay time advantageously applied to the reference path to de-chirp the returned signals at the optical detector.

In step 421, commands for the scanning optics based on each adaptive scan pattern corresponding to each range gate is forwarded to the ranging system, or the scanning optics within the system, to operate the scanning laser ranging system to obtain range measurements along the adaptive scan trajectory at the adaptive horizontal angular resolution and at the adaptive vertical angular resolution. In some embodiments, step 421 includes sending data indicating the delay time $\Delta t_{LOn}$ from Equation 4 for the current range gate, or more of the N different range gates. In some of these embodiments, the ranging system modulates the laser light using RF waveform generator 215*a* and modulator 214*b* in FIG. 2B to impose the computed delay time $\Delta t_{LOn}$.

In step 431, the resultant set of point cloud points acquired via sequential adaptive scans for all of the range gate areas in angle space are assembled to constitute the final 3D data product which is a collection of one or more point clouds that preserves the target spatial resolution, s, for all scanned objects. Simultaneously, the adaptive scans avoid scanning angle spaces with no returns or too close to the ranging system, or some combination. In step 441, a device is operated based on the final 3D data product. In some embodiments, this involves presenting on a display device an image that indicates the 3D data product. In some embodiments, this involves communicating, to the device, data that identifies at least one object based on a point cloud of the 3D data product. In some embodiments, this involves moving a vehicle to approach or to avoid a collision with the object identified or operating a weapons system to direct ordnance onto the identified object.

In some embodiments, steps 403 through 431 are individually or collectively performed automatically and in real-time or near real time, as described for some example embodiments below. For purposes of this description, real-time is based on a frame rate (FR) of the 3D scanner (e.g. LIDAR) used to capture the 3D point cloud. An inverse of the frame rate is a time capture period during which the 3D scanner captures the 3D point cloud. In some embodiments, real-time is defined as a period within the time capture period. In some example embodiments, the frame rate is in a range from about 4 to about 10 frames per second (fps), corresponding to a time capture period of 0.1-0.25 seconds (sec). This kind of time period is advantageous for identifying objects in tactical and collision avoidance applications. Near real-time is within a factor of about ten of real-time, e.g., within about 2.5 seconds for the above example time capture periods.

4. EXAMPLE EMBODIMENTS

In a frequency modulated continuous wave (FMCW) chirp LIDAR ranging system, the range window is governed by a combination of the chirp bandwidth, the digitizer bandwidth, and the pulse repetition frequency (PRF). Thus a basic FMCW system will be limited in range for larger PRFs and bandwidths. This limits the ability of the system to acquire range data quickly and at long range. This limitation was overcome by considering separate modulators on the LO and transmitter/return signal path of the chirp waveform to affect a software programmable range delay (e.g., using the RF waveform generator 215 with a separate modulator 214*b* in reference path 282 as described above with reference to FIG. 2B). The time delay of the LO waveform allows the ranging frequency bandwidth, B, for the given range delay to be reduced so that it is in the band of the detector/digitizer system. This concept enables rapid range data acquisition within range windows at non-zero range delays. This can be paired with the adaptive scan algorithms to more quickly acquire data in a volume of interest, e.g., using a different reference path delay for the scan trajectory of each different range gate.

The adaptive angular scan procedure is designed to produce (within the abilities of the beam scanning hardware) a scan pattern that conforms to the angular boundaries of the volume under interrogation. This prevents the system from “scanning the sky” or “scanning the ground”. The scan patterns are constructed by considering coarse non-adaptive scans of the volume. This is used to define the boundary of the actual hard targets within the range window in question. Research software was implemented to demonstrate the speed and utility of the approach.

Figure 5:
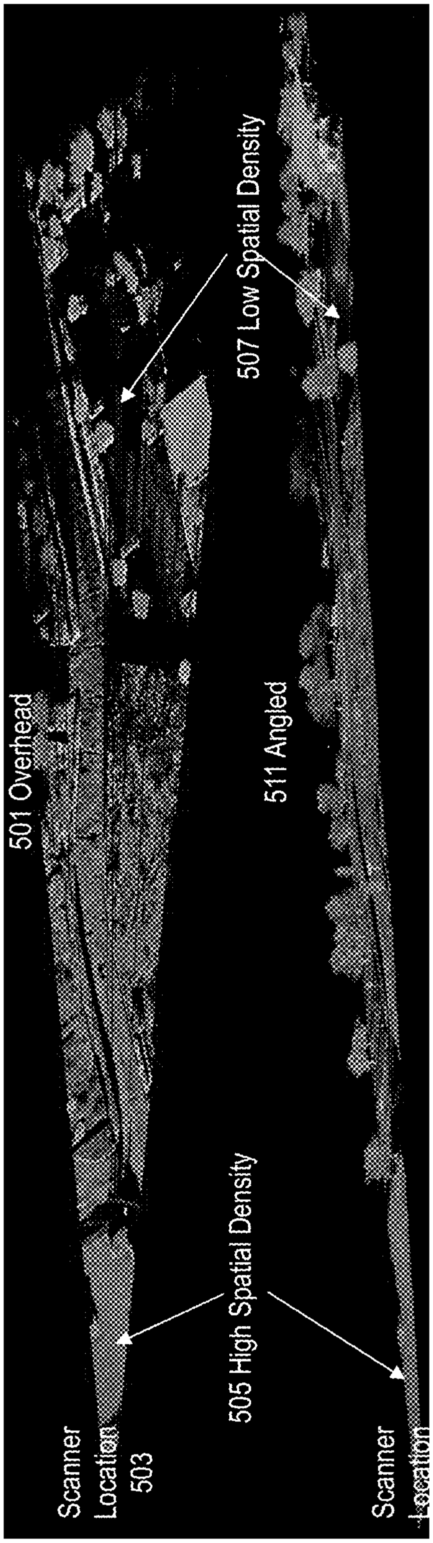
FIG. 5 is an image that illustrates example ranges to backscattered returns in an overhead view and an angled perspective view, according to an embodiment.

FIG. 5 is an image that illustrates example ranges to backscattered returns in an overhead view and an angled perspective view, according to an embodiment. The grey pixels in the upper portion of FIG. 5A depict an overhead view 501 of horizontal angles and ranges where a return was detected by the scanning laser ranging system in an experimental embodiment. In this experiment, the scanning laser ranging system included a model HRS-3D-AS adaptive scanner from BLACKMORE SENSORS AND ANALYTICS™ Inc of Bozeman, Montana. The range window was 3 meters to 96 meters. The horizontal angle range is about 370 degree Coverage with the rotation stage and the vertical angel range is about 60 degrees. The range resolution is about 7.5 cm. The grey pixels in the lower portion of FIG. 5A depict a perspective angled view 511 of ranges and elevations and relative horizontal positions where a return was detected by the scanning laser ranging system in the same experiment. In both views, the scanning laser ranging system location 503 is at the left edge of the image. Near the scanning laser ranging system location 503, the returns 505 provide high spatial density, even higher than desired for some embodiments and thus finer spatial resolution than the corresponding target spatial resolution s. Far from the scanning laser ranging system location 503, the returns 507 provide low spatial density, below the desired spatial density, and thus coarser than the corresponding target spatial resolution s, for some embodiments.

FIG. 6A is an image that illustrates example range gates for ranges to backscattered returns in an angled perspective view from FIG. 5, according to an embodiment. The grey pixels depict a perspective angled view 511 of ranges and elevations and relative horizontal positions where a return was detected by the scanning laser ranging system in the same experiment as in the lower portion of FIG. 5A. The ranges have been divided into 4 range gates, e.g., N=4, which are range gate 1, 521; range gate 2, 522; range gate 3, 523; and range gate 4, 524.

Figure 6E:
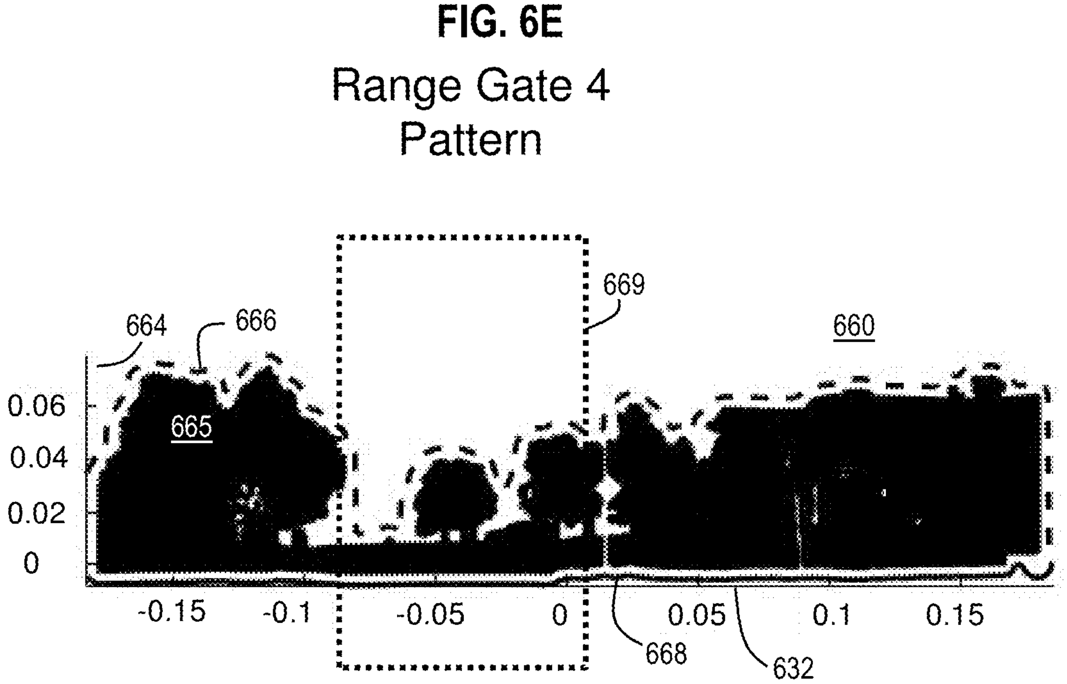

FIG. 6B through FIG. 6E are masks in scanning angle space that show example locations of returns in each of four range gates illustrated in FIG. 6A, according to an embodiment. The black areas in angle space indicate azimuthal and elevation angles, α and ε, where there are range returns in the first range gate, and, thus indicate areas where fine resolution scanning is useful. The coarse masks have $10^{-3}$ radians (about 0.06 degrees) resolution horizontally with not more than $10^{-4}$ radians (about 0.006 degrees) resolution vertically. The horizontal axis 632 indicates azimuth α from about −0.2 to about +0.2 radians, corresponding to about −11.5 degrees to +11.5 degrees. The vertical axes indicate elevation ε and vary slightly in extent among the four masks. FIG. 6B is a binary image 630 that depicts locations in angle space of returns from the first range gate, n=1. The vertical axis 634 extends from about −0.12 to about 0 radians, corresponding to about −7 degrees to 0 degrees, level. There are no returns above −0.05 radians (about −3 degrees). A characteristic range in the black mask area 635 is used with the target spatial resolution, s, and Equation 2a or 2c to determine an angular resolution Δθ. For a column-order or vertical saw-tooth scan trajectory, the area to be covered is between the minimum vertical angle at about −0.12 radians and a maximum vertical angle traced out by the dashed trace 636. For a row-ordered or horizontal saw-tooth scan trajectory, the minimum and maximum azimuthal angles (not shown) would be −0.2 radians and +0.2 radians, respectively, for elevations below −0.05 radians.

Similarly, FIG. 6C a binary image 640 that depicts returns from the second range gate, n=2. The vertical axis 644 extends from about −0.06 to about 0.11 radians, corresponding to about −3.5 degrees to 6.3 degrees. There are no returns below about −0.05 radians (about −3 degrees) the maximum elevation angle for the first range gate. Returns in the second range gate are indicated by the black area 645 and suggest a lamp post and a tree to the right of the lamp post with a ground level below 0 radians. A characteristic range in the black mask area 645 is used with the target spatial resolution, s, and Equation 2a or 2c to determine an angular resolution Δθ. For a column-order or vertical saw-tooth scan trajectory, the area to be covered is between the minimum vertical angle at about −0.5 radians and a maximum vertical angle traced out by the dashed trace 646 that is single valued at each azimuthal angle α. For a row-ordered or horizontal saw-tooth scan trajectory, the minimum and maximum azimuthal angles (not shown) are each single valued in elevation angle ε. For a row-ordered or horizontal saw-tooth scan trajectory, the minimum and maximum azimuthal angles (not shown) are each single valued in elevation angle □. The minimum azimuthal angle would trace the left side of the lamp post and the maximum azimuthal angle would trace the right side of the tree.

FIG. 6D a binary image 650 that depicts returns from the third range gate, n=3. The vertical axis 654 extends from about −0.01 to about 0.11 radians, corresponding to about −0.6 degrees to 6.3 degrees. There are no returns below about −0.01 radians (about −0.6 degrees), which is about the maximum elevation angle for the ground level of the second range gate. Returns in the third range gate are indicated by the black area 655 and suggest a copse of trees, several lamps and sign posts to the right of the copse and a bush to the far right, with a ground level topping off at about 0 radians. A characteristic range in the black mask area is used with the target spatial resolution, s, and Equation 2a or 2c to determine an angular resolution Δθ. For a column-order or vertical saw-tooth scan trajectory, the area to be covered is between the minimum vertical angle given by trace 658 and a maximum vertical angle given by the dashed trace 656 that is single valued at each azimuthal angle α. For a row-ordered or horizontal saw-tooth scan trajectory, the minimum and maximum azimuthal angles (not shown) are each single valued in elevation angle ε. The minimum azimuthal angle would trace the left side of copse of trees and the maximum azimuthal angle would trace the right side of the trees down to the elevation of the posts, from there to the right side of the posts down to the elevation of the bush, and from there to the right side of the bush.

FIG. 6E a binary image 660 that depicts returns from the last range gate, n=4. The vertical axis 664 extends from about 0 to about 0.08 radians (because of perspective, farther objects appear smaller and extend a shorter distance in vertical angles), corresponding to about 0 degrees to about 4.5 degrees. There are no returns below about 0 radians, which is about the maximum elevation angle for the ground level of the third range gate. Returns in the fourth range gate are indicated by the black area 665 and suggest a copse of trees, a clearing and then a wide stand of trees, with a ground level topping off at about 0.01 radians. A characteristic range in the black mask area 665 is used with the target spatial resolution, s, and Equation 2a to determine an angular resolution Δθ. For a column-order or vertical saw-tooth scan trajectory, the area to be covered is between the minimum vertical angle given by trace 668 and a maximum vertical angle given by the dashed trace 666 that is single valued at each azimuthal angle α. For a row-ordered or horizontal saw-tooth scan trajectory, the minimum and maximum azimuthal angles (not shown) are each single valued in elevation angle ε. The minimum azimuthal angle would trace the left side of copse of trees and the maximum azimuthal angle would trace the right side of the trees down to the elevation of the stand of trees, from there to the right edge at 0.20 radians. Note that such a row ordered scan would not eliminate as much area from the high precision scan as does the column order or saw-tooth scan trajectories. A dotted box 669 indicates a horizontal portion of the area displayed with a high precision scan trajectory in FIG. 7A and FIG. 7B.

Figure 7A:
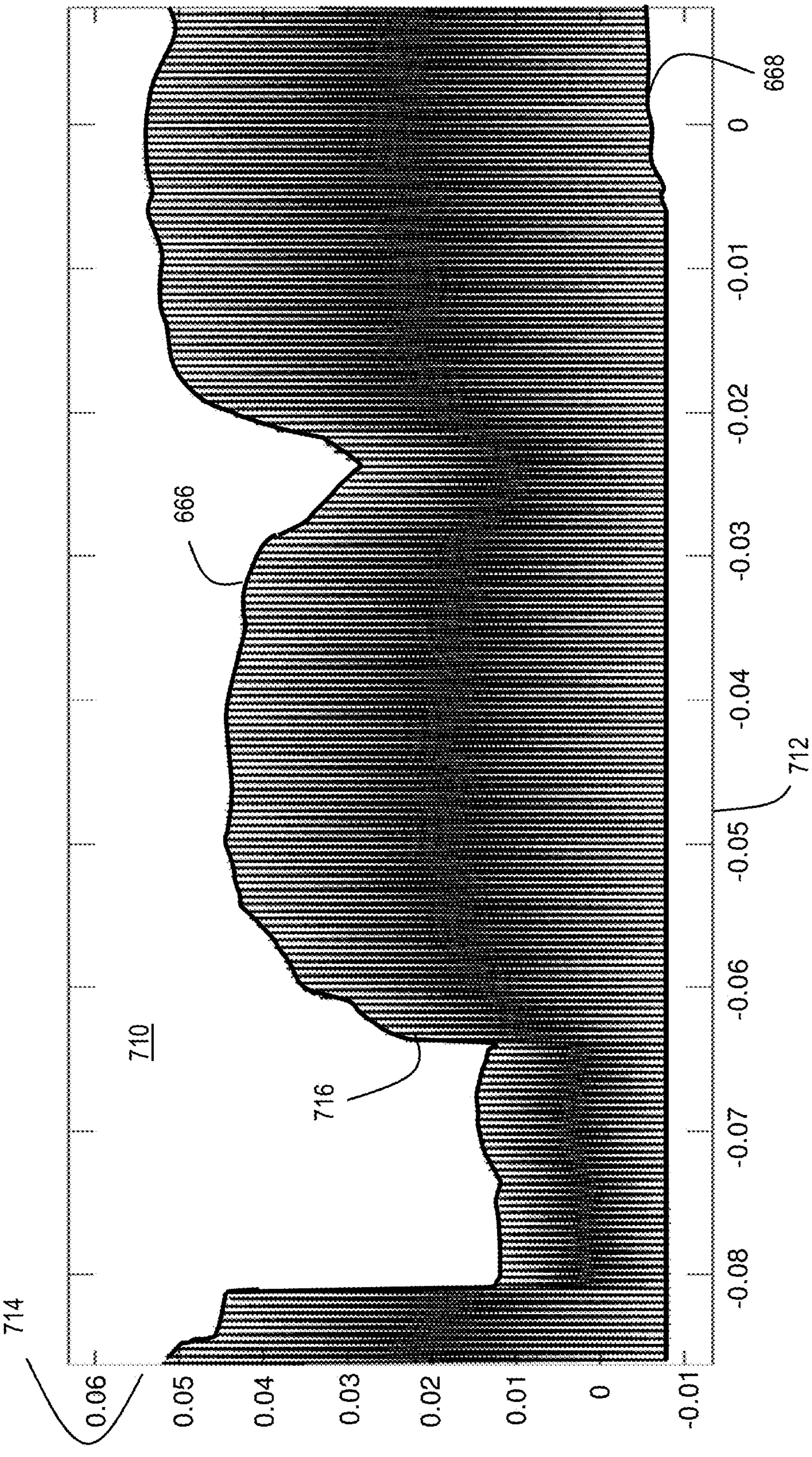
FIG. 7A and FIG. 7B are graphs that illustrate example adaptive scanning patterns in multiple contiguous horizontal slices in a portion of the range gate depicted in FIG. 6E for different characteristic ranges (or different target spatial resolutions) respectively, according to an embodiment.
Figure 7B:
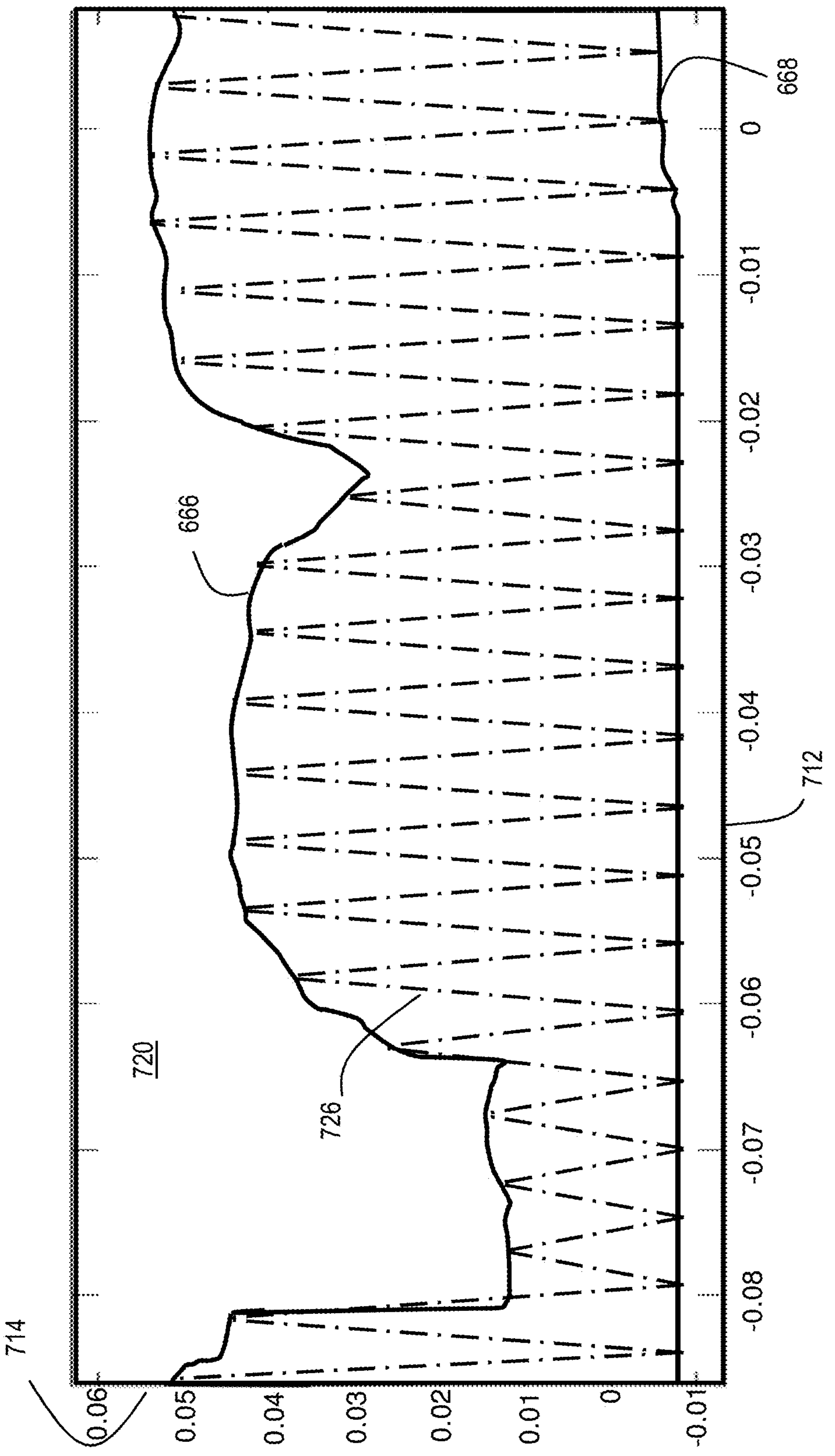

FIG. 7A and FIG. 7B are graphs that illustrate example adaptive scanning patterns in multiple contiguous horizontal slices in a portion of the range gate depicted in FIG. 6E for different characteristic ranges (or different target spatial resolutions) respectively, according to an embodiment. The horizontal axis 712 indicates azimuthal angle in radians from about −0.085 radians to about 0.005 radians, corresponding to a window from about −5 degrees to about 0.3 degrees, and depicted as horizontal extent of dotted rectangle 669 in FIG. 6E. The vertical axis 714 indicates elevation angle in radians from about −0.01 radians to about 0.06 radians, corresponding to a window from about −0.6 degrees to about 3.5 degrees. The minimum vertical angle given by trace 668 and maximum vertical angle given by the dashed trace 666 from FIG. 6E in the current window are also plotted. Both traces have been interpolated to the fine angular resolution of this adaptive scan trajectory. FIG. 7A is a graph 710 of a high resolution scan trajectory 716 between the minimum and maximum elevation angles. The horizontal repeat separation angle, $A_{HR}$, is about 0.0005 radians (note there are 20 repeats between tick marks that are 0.01 radians apart), corresponding to a separation angle of about 0.03 degrees. Assuming this repeat separation angle is equal to $\Delta\theta$, then $\Delta\theta$ also equals 0.03 degrees. Thus, ranges are measured every 0.03 degrees in the vertical along this saw-tooth scan trajectory.

FIG. 7B is a graph 720 of a high resolution scan trajectory 726 between the minimum and maximum elevation angles under different range or target resolution conditions. For purposes of illustration, in FIG. 7B it is assumed that the characteristic range is much smaller, or the target spatial resolution, s, is much courser than the values used to generate FIG. 7A. As a result, the angle resolution determined from Equation 2a is much less fine. In FIG. 7B, the horizontal repeat separation angle, $A_{HR}$, is about 0.003 radians (note there are about 3.3 repeats between tick marks that are 0.01 radians apart), corresponding to a separation angle of about 0.17 degrees, about six times less fine than in FIG. 7A. Assuming this repeat separation angle is equal to $\Delta\theta$, then $\Delta\theta$ also equals 0.17 degrees. Thus, ranges are measured every 0.17 degrees in the vertical along this saw-tooth scan trajectory. For illustration purposes, the reader can assume range measurements are made about where the dots are in the dot-dashed line segments representing the saw tooth scan trajectory.

In some embodiments, the adaptive scanning is performed automatically and in real time. In such embodiments, various methods are used to automate the determination of characteristic ranges, scan areas, scan trajectories, and angular resolutions and perform the adaptive scanning quickly enough to allow desirable frame rates of about one or more frames per second.

As stated above, in some embodiments the range gates, e.g., value of N and the N values of $Rnear_n$ are predetermined or set manually before the adaptive scanning. In some embodiments, however, the value for N, or the N values for $Rnear_n$, or both are determined automatically and adaptively based on the observed ranges $R(\alpha, \varepsilon)$ in the coarsely spaced range measurements. For example, as described above, N and $Rnear_n$ are determined based on low and high percentiles (e.g., 5th and 99th percentiles) of the observed ranges.

Figure 10:
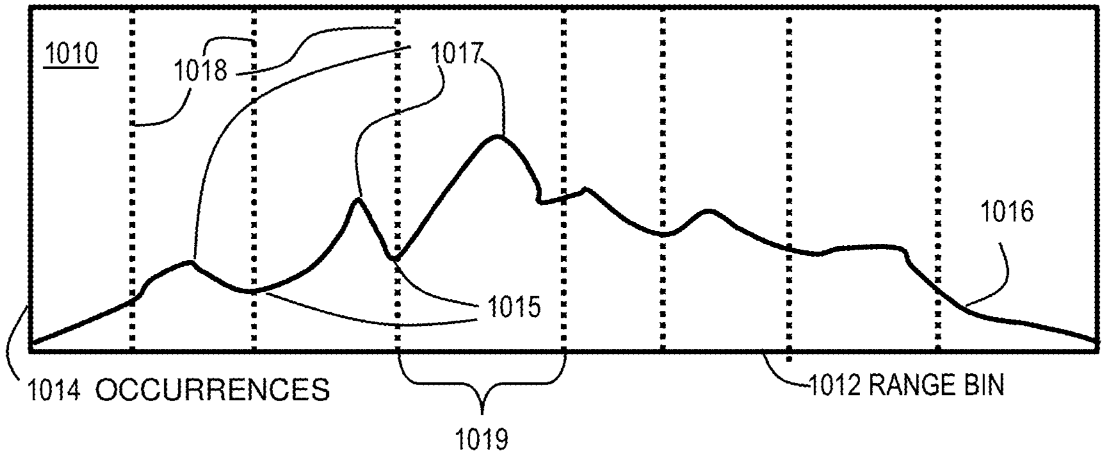
FIG. 10 is a graph that illustrates an example histogram of ranges in a course angular scanning of a scene, according to an embodiment.

In another embodiment, the number N and values $Rnear_n$ are determined based a histogram of $R(\alpha, \varepsilon)$ in the coarsely spaced range measurements. FIG. 10 is a graph 1010 that illustrates an example histogram of ranges in a course angular scanning of a scene, according to an embodiment. It is assumed that the scanning laser ranging system is configured for ranges up to Rmax. The horizontal axis 1012 indicates a range bin having a bin width that is small compared to Rmax, e.g. having a bin width of one tenth to one hundredth or even one thousandth of Rmax. The vertical axis 1014 indicates the number of occurrences of measured ranges that falls within any range bin. Trace 1016 depicts an example histogram. Note that the number of occurrences is not flat but has several peaks 1017 and valleys 1015. Large features are likely to generate a peak in the histogram while open areas are likely to generate valleys. In some embodiments, the range histogram was re-scaled as a function of range to account for the fact that the coarse scan is performed with constant angular density. The re-scaling weights more distant point measurements more heavily in the histogram to account for this discrepancy.

In some embodiments, one or more range gate values $Rnear_n$ are determined to be at the occurrence valleys in the histogram 1016, as indicated by the vertical dotted lines. In some of these embodiments, the characteristic range for the range gate is then the range of maximum occurrence (e.g., $Rpeak_n$) in the range gate. Both the minima and the peak values are quickly and automatically determined using a variety of available software routines.

In other embodiments a cumulative histogram can be produced which does not require the definition of bin widths. The rate of change of the cumulative histogram can be used, instead of the trace 1016 depicted in FIG. 10, to find peaks and valleys.

Figure 11A:
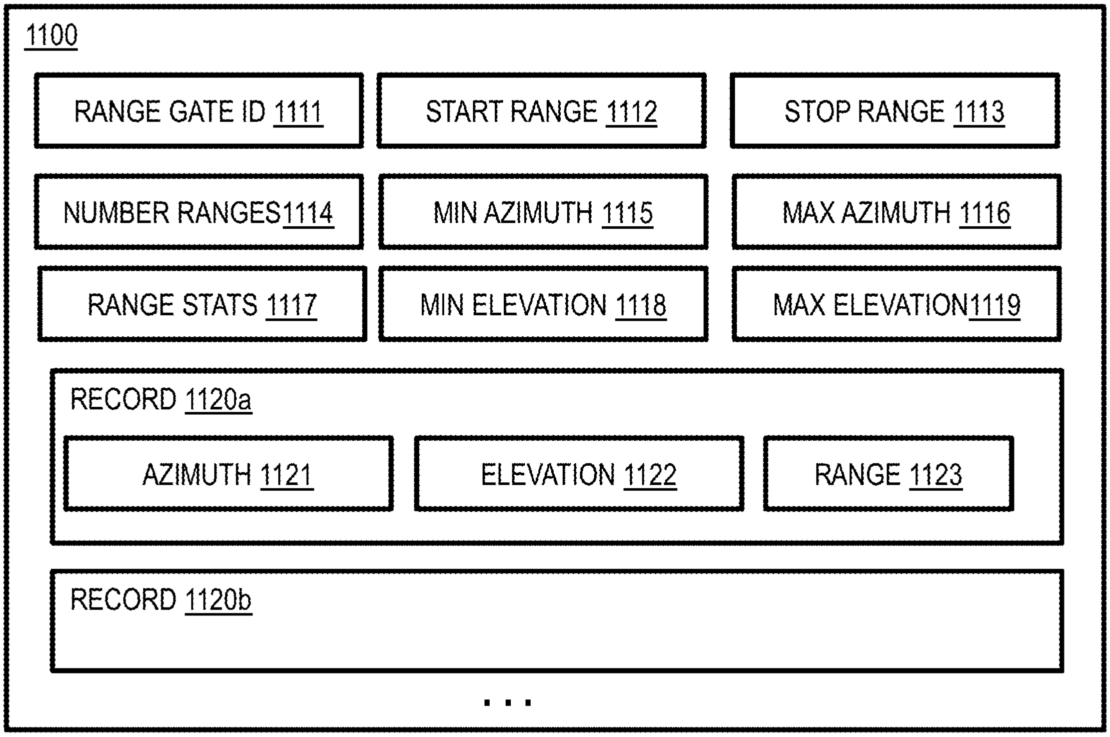
FIG. 11A is a block diagram that illustrates a data structure for course angular scanning of a scene, according to an embodiment.

FIG. 11A is a block diagram that illustrates a data structure 1100 for course angular scanning of a scene, according to an embodiment. This data structure stores the range gate set, RGn, in horizontal angle order to provide computational efficiencies when conducting certain steps described herein. Of course, for embodiments using row-order or horizontal saw-tooth scan trajectories, the horizontal angle minimum and maximum values are stored in vertical angle order, instead. For simplicity it is assumed, herein, that column-order or vertical saw-tooth scan trajectories are used. Although data structure and fields are depicted in FIG. 11A, and subsequent diagrams in FIG. 11B, as integral blocks in a particular order for purposes of illustration, in other embodiments, one or more data structures or fields, or portions thereof, are arranged in a different order, in the same or different number of data structures or databases in one or more hosts or messages, or are omitted, or one or more additional fields are included, or the data structures and fields are changed in some combination of ways.

The course scan data structure 1100 includes a range gate ID field 1111, a start range field 1112, a stop range field 1113, a number of ranges field 1114, a range statistics field 1117, a minimum azimuth field 115, a maximum azimuth field 1116, a minimum elevation field 1118 and a maximum elevation field 1119. The data structure 1100 also includes one or more coarse scan record fields 1120*a*, 1120*b*, among others indicted by ellipsis and collectively referenced hereinafter as coarse scan record fields 1120.

The range gate ID field 1111 holds data that indicates a unique identifier for each of the N range gates, for example the number n for the nth range gate. The start range field 1112 holds data that indicates $Rnear_n$; and the stop range field 1113 holds data that indicates $Rfar_n$. The number of ranges field 1114 holds data that indicates how many coarse ranges fall in the current range gate. That number, for example, is given by the sum of the bins between the vertical dotted lines in FIG. 10. The range stats field 1117 holds data that indicates one or more statistical properties of the ranges in the range gate which may be used, for example, as a characteristic range, such as an average range, or a root mean square range, or a median range, or one or more peak ranges, or one or more percentile ranges, among others, alone or in some combination. In some embodiments, the field 1117 is omitted. The minimum azimuth field 1115 holds data that indicates the smallest horizontal angle in the range gate; and, the maximum azimuth field 1116 holds data that indicates the largest horizontal angle in the range gate. Similarly, the minimum elevation field 1118 holds data that indicates the smallest vertical angle in the range gate; and, the maximum elevation field 1119 holds data that indicates the largest vertical angle in the range gate.

Each coarse scan record 1120 includes data that indicates the azimuth, elevation, range triplet, R(α, ε), for the coarse data, as depicted in the azimuth field 1121, elevation field 1122 and range field 1123, respectively. The records are arranged in order of increasing azimuth value, as collected by the coarse scan data and gated by the $Rnear_n$ values so the construction of the data records is very rapid. Even if the range gates are not defined until the coarse data is collected, the raw collected data is stored in fast memory in azimuth order, and the histogram is filled as the data is collected. Once the histogram is collected, the values for N and $Rnear_n$ are computed rapidly and used to fill the fields 1111, 1112 and 1113. Then the stored raw data is recalled from fast memory, already in azimuth order, and placed in the corresponding data structure in records that are naturally and automatically in azimuth order. The values for fields 1114 through 1119 are kept in fast memory and incremented as each record is added to the data structure. After the last range has been recalled, the values for fields 1114 through 1119 are written once to the data structure. As a result, the data structures 1100 can be filled with only two input/output (I/O) operations per record.

Figure 11B:
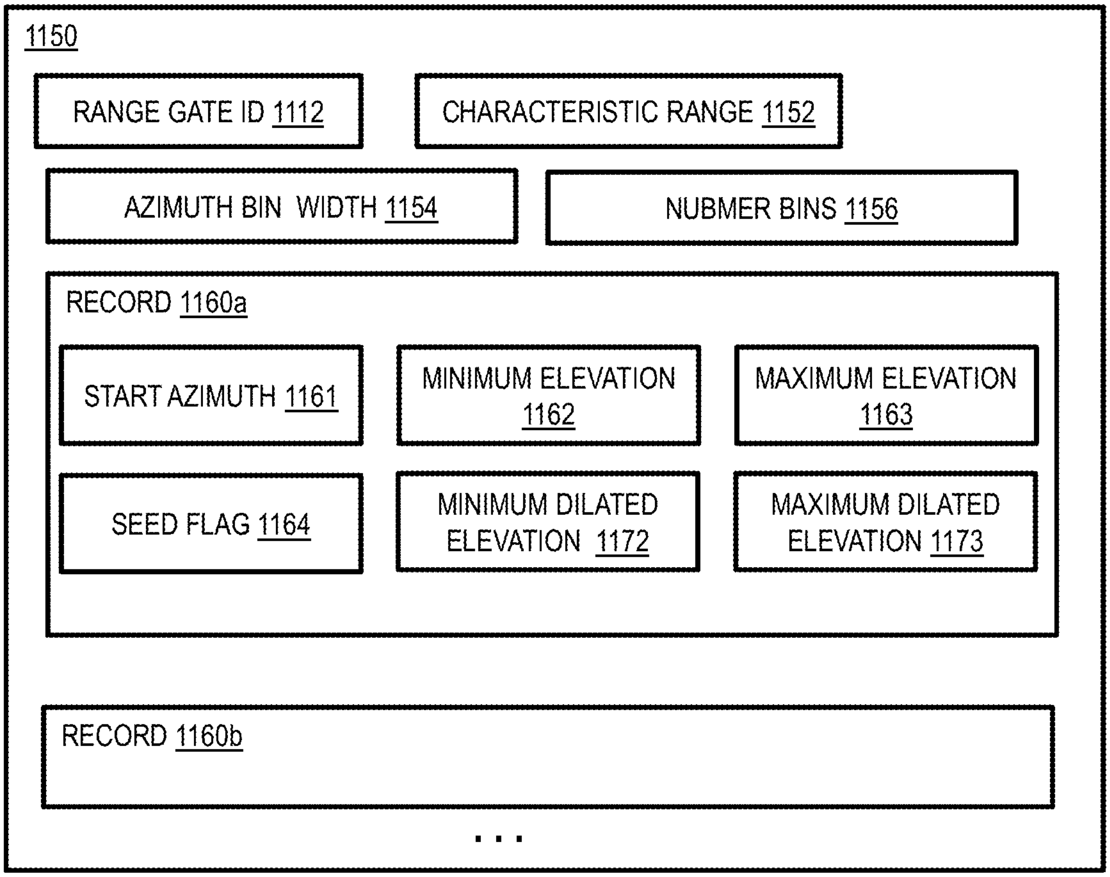
FIG. 11B is a block diagram that illustrates a data structure for adaptive maximum and minimum vertical angles for multiple horizontal angle bins, according to an embodiment.

Another data structure, depicted in FIG. 11B, is used to store the maximum and minimum scan angles as a function of azimuth for use in defining the traces, such as traces 666 and 668 depicted in FIG. 7A or FIG. 7B, to produce fine scale scan trajectory, such as depicted in those same figures. To do this with a saw-tooth scan trajectory of the coarse scan, for which each different azimuth value has a single elevation value, the data must be binned in azimuth bins that are large enough to handle all the elevation samples in one vertical sweep of the saw tooth scan trajectory. For example, the data are advantageously binned in azimuth bins that are at least one horizontal repeat separation angle, $A_{HR}$, wide. Wider azimuthal bins can also be used, and even bins half as wide can be used if properly aligned with the start of a vertical sweep. Of course, in row-order or horizontal saw-tooth scan trajectories, the azimuth and elevation angles switch roles, and the vertical slice width is chosen to include all the azimuthal angles in a horizontal sweep.

FIG. 11B is a block diagram that illustrates a data structure 1150 for adaptive maximum and minimum vertical angles for multiple horizontal angle bins, according to an embodiment. Data structure 1150 includes range gate ID field 1112, characteristic range field 1152, azimuth bin width field 1154, and number of bins field 1156. The range gate ID field is as described above for data structure 1100. The characteristic range field 1152 holds data that indicates the characteristic range to use for the range gate, e.g., $Rfar_n$, or one of the range statistics in field 1117 of data structure 1100. The azimuth bin width field 1154 holds data that indicates the width of the azimuth bin used to collect a sweep of elevation angles, such as a factor of the $A_{HR}$, where the factor varies from 0.5 to 1 or more. The bin defines the horizontal width of a slice that is used to define an elevation maximum and minimum as a function of azimuth. The number of bins field 1156 holds data that indicates the number of bins in the data structure, and therefor the number of maximum elevation values and the number of minimum elevation values.

The data structure also includes records 1160*a* and 1160*b* among others indicated by ellipsis, collectively referenced as records 1160. Each record 1160 holds a start azimuth field 1161, a minimum elevation field 1162, and a maximum elevation field 1163. In the illustrated embodiment, each record 1160 also includes a seed flag field 1164, a minimum dilated elevation field 1172 and a maximum dilated elevation field 1173. The start azimuth field 1161 holds data that indicates the smallest azimuth in the bin, so the data can be plotted as a function of azimuth. The minimum elevation field 1162 holds data that indicates the minimum elevation value in the azimuth bin slice. The maximum elevation field 1163 holds data that indicates the maximum elevation value in the azimuth bin slice. The seed flag field 1164 holds data that indicates whether the maximum and minimum values are used to seed a dilation and interpolation or extrapolation of the minimum and maximum elevation values to azimuths at the finer resolution. If so, then the minimum dilated elevation field 1172 holds data that indicates the value when the minimum value is decreased to reduce the chances that members of the current range gate are missed during closer sampling, due to the coarse sampling, and interpolated horizontally for a saw tooth trajectory. Similarly, the maximum dilated elevation field 1173 holds data that indicates the elevation value when the maximum elevation value is increased to reduce the chances that members of the current range gate are missed during closer sampling, due to the coarse sampling, and interpolated horizontally for a saw tooth trajectory.

Figure 12:
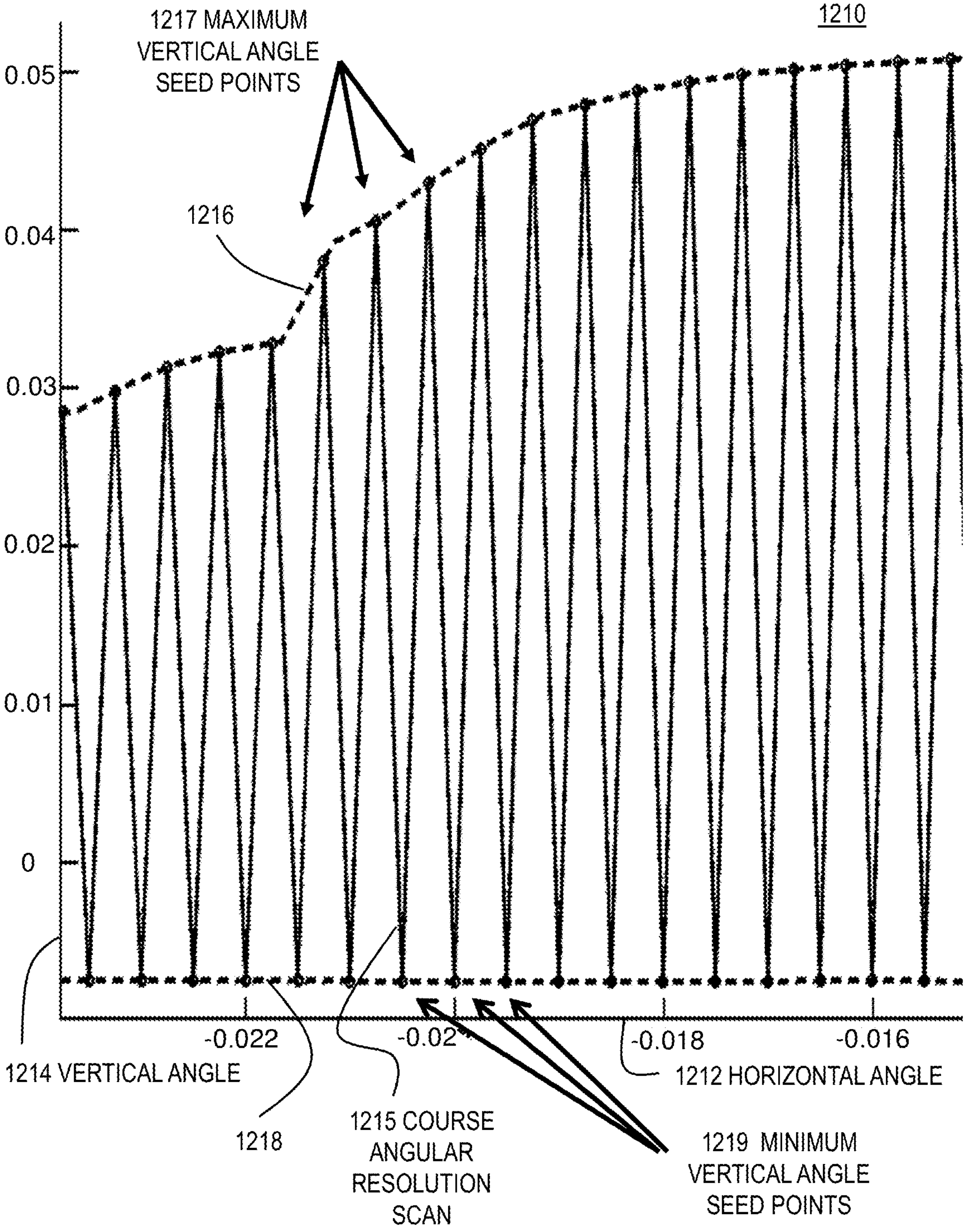
FIG. 12 is a graph that illustrates example horizontal angle dependence of maximum vertical angles and horizontal dependence of minimum vertical angles for a range gate, according to an embodiment.

FIG. 12 is a graph that illustrates example horizontal angle dependence of maximum vertical angles and horizontal dependence of minimum vertical angles for a range gate, according to an embodiment. The horizontal axis 1212 indicates azimuth (horizontal angle) in radians and the vertical axis 1214 indicates elevation (vertical angle) in radians. The trace 1215 indicates the desired high resolution saw-tooth scan trajectory connecting seed points. The trace 1216 indicates the seed points for maximum elevation values as a function of azimuth and the trace 1218 indicates the seed points for minimum elevation values as a function of azimuth. Some seed points 1217 are indicated on the trace 1216 of maximum elevation values. Some seed points 1219 are indicated on the trace 1218 of minimum elevation values. The seed points are found by interpolating dilated traces, described next, to the desired fine resolution saw tooth scan trajectory in which the maximum elevation seed points are offset in azimuth from the corresponding minimum elevation seed points by the fine resolution Δθ/2, and are separated vertically by an integer multiple of the fine resolution Δθ.

Figure 13A:
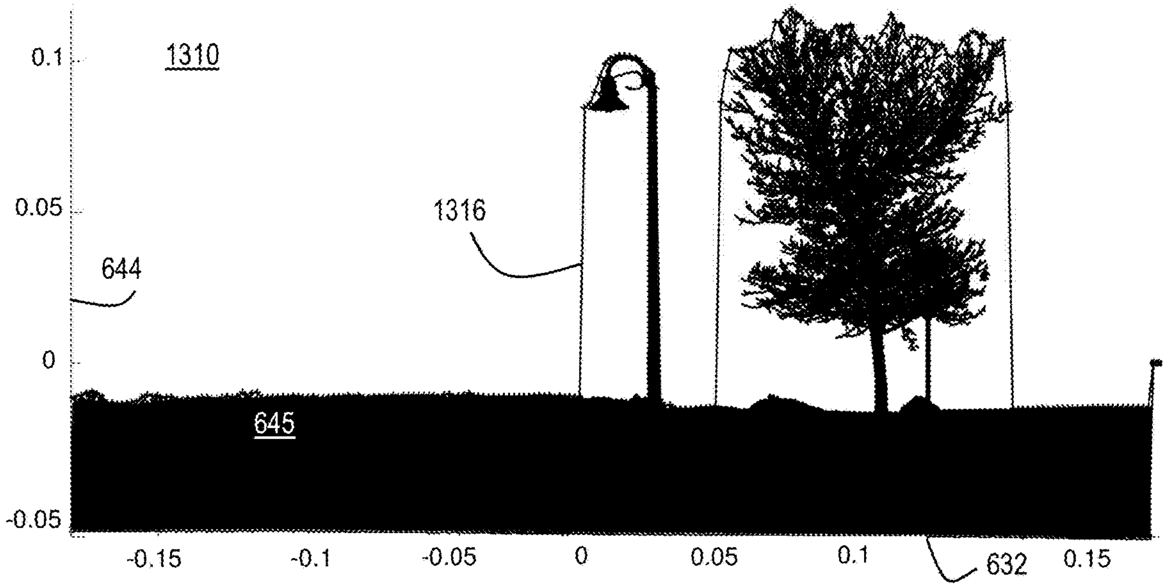
FIG. 13A and FIG. 13B are masks in scanning angle space that show example un-dilated (tight) and dilated, respectively, maximum and minimum vertical angles for one range gate illustrated in FIG. 6C, according to an embodiment.
Figure 13B:
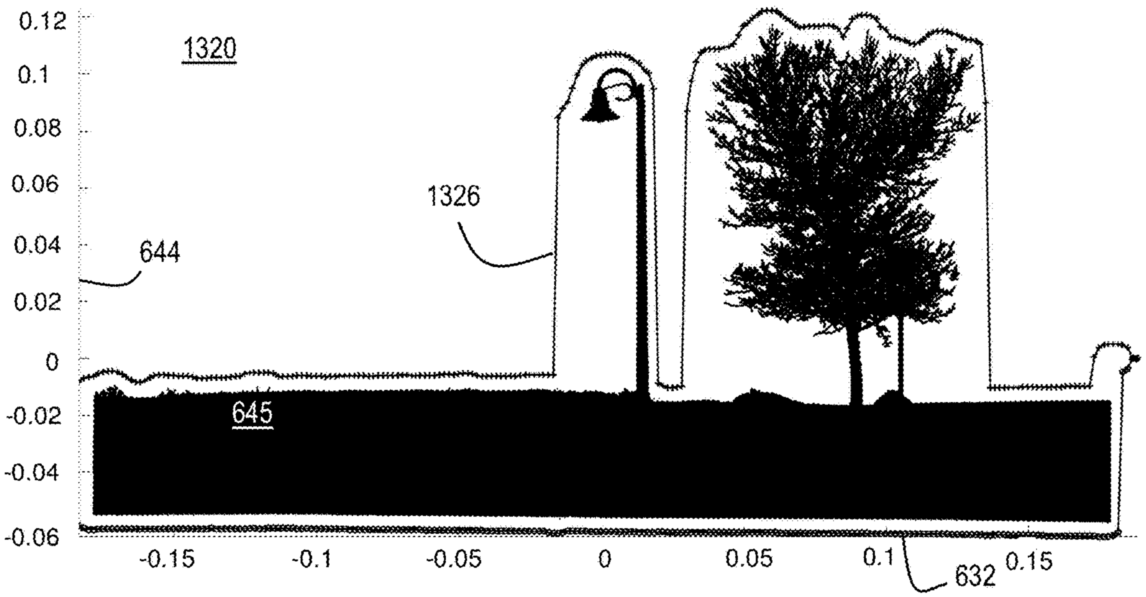

FIG. 13A and FIG. 13B are masks in scanning angle space that show example un-dilated (tight) and dilated, respectively, maximum and minimum vertical angles for one range gate illustrated in FIG. 6C, according to an embodiment. FIG. 13A is an expanded view of FIG. 6C as binary image 1310, in which the maximum values 1316 remain tightly defined by the observed maximum on the coarse range sampling. FIG. 13B is an expanded view of FIG. 6C as binary image 1320, in which the maximum values 1326 have been dilated outward from the observed maximum on the coarse range sampling, and the minimum values have been dilated downward from the observed tight minimum elevation.

In some embodiments, once the fine scale range measurements have been taken in one range gate, the boundary with the adjacent range gate can be further refined before the scan trajectory is computed for the adjacent range gate.

Figure 14:
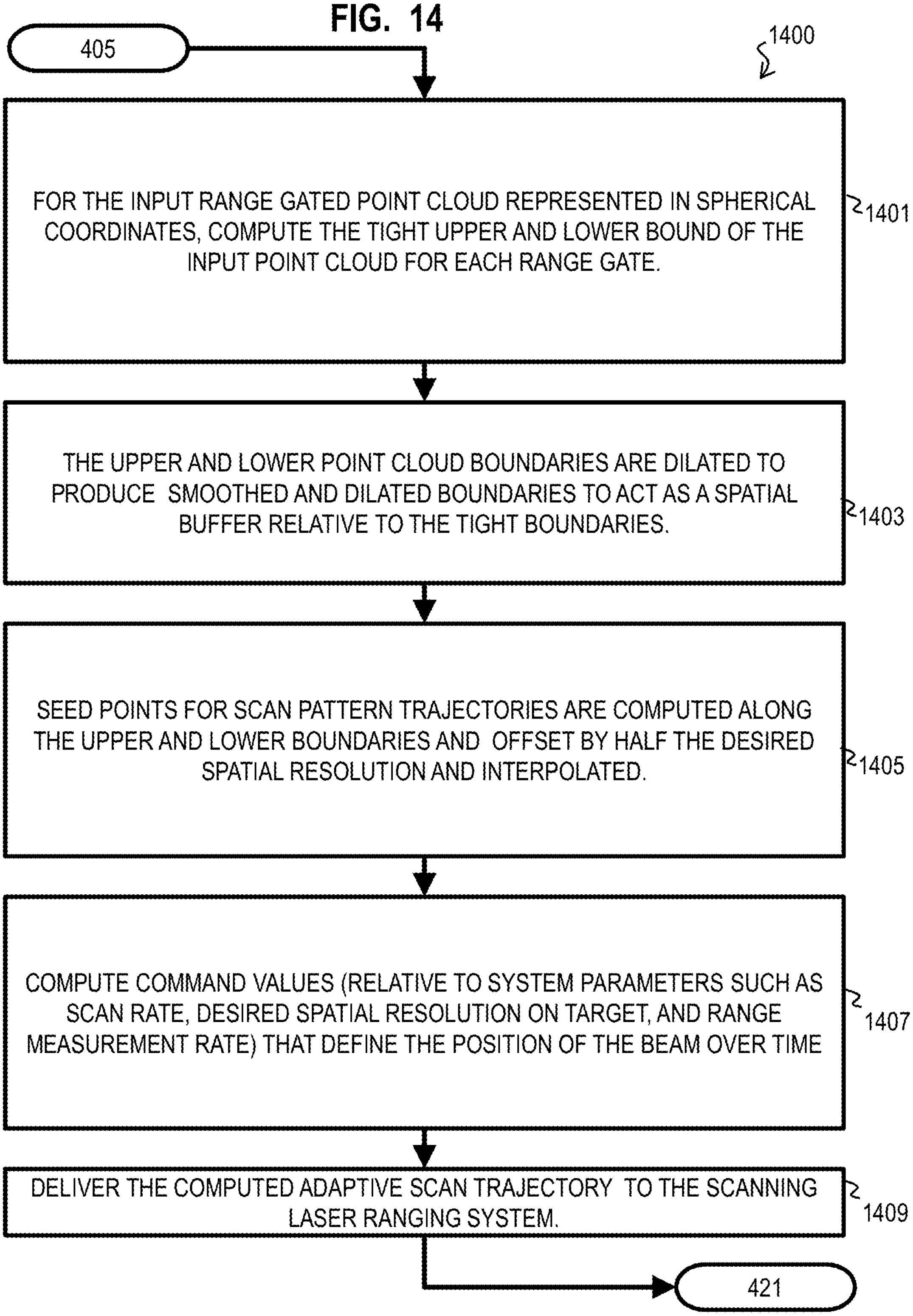
FIG. 14 is a flow chart that illustrates an example method to automatically determine adaptive angular scanning in near real time, according to an embodiment.

FIG. 14 is a flow chart that illustrates an example method 1400 to automatically determine adaptive angular scanning in near real time, according to an embodiment. Method 1400 is an example automated real-time embodiment of step 411 from FIG. 4, to compute an adaptive scan trajectory for each range gated set of points. Thus, the data structure 1100 of FIG. 11A has been populated as described with reference to that figure, during step 405.

In step 1401, the coarse input range gated point cloud, represented in spherical coordinates, e.g., in data structure 1100, is used to compute the upper and lower bound in the vertical angular coordinate for each defined horizontal angular coordinate bin. In some embodiments, step 1401 includes pre-sorting the horizontal coordinate (either explicitly in software, or explicitly by virtue of the data collection) to greatly simplify this step. The output of this operation includes two traces describing the tight upper and tight lower bound of the input point cloud, e.g., the maximum elevation in field 1163, and the minimum elevation in field 1162, respectively, each as a function of start azimuth in field 1161 available in records 1160 of data structure 1150 depicted in FIG. 11B.

In step 1403, the upper and lower point cloud tight boundaries are dilated, e.g., using a Minkowski sum type operation described in Haralick, 2007. As a result, an upper semicircular shape is added to the upper boundary; and, a lower semicircular shape is added to the lower boundary. The result of this operation is an upper and lower boundary that is smoothed and dilated to act as a spatial buffer relative to the tight boundaries. For example, this output is found in maximum dilated elevation in field 1172, and the minimum dilated elevation in field 1173, respectively, each as a function of start azimuth in field 1161 available in records 1160 of data structure 1150 depicted in FIG. 11B.

In step 1405, seed points for fine scale scan trajectories are computed along the upper and lower boundaries as a first step to computing the adaptive scan waveforms to drive the scan hardware. The positions of the upper seed point set are offset by half the desired spatial resolution (e.g., $\Delta\theta/2$) from the bin center, and thus each upper seed point is offset relative to the lower seed point, to support a vertical saw-tooth scan trajectory. For other embodiments using other scan trajectories, the seed points offsets would be zero for row-order or column order scans, or the left seed point is offset relative to the right seed points in a horizontal saw-tooth. The elevation coordinate of the seed point may be interpolated relative to the upper and lower smoothed and dilated boundary to fall an integer multiple of $\Delta\theta$ from the opposite boundary. This is advantageous when the coarse sampling resolution is much different from the desired resolution.

In step 1407, the set of seed points are used as endpoints of a computation to compute command values (relative to system parameters such as scan rate, desired spatial resolution on target, and range measurement rate) that define the position of the beam over time in a sense that provides even angular sampling across the scan trajectory. For example, the horizontal and vertical scan trajectory points reported at the output sample rate of a digital to analog converter (DAC) driving the beam-steering system are spaced linearly between the respective horizontal and vertical bounds (horizontal and vertical seed point locations). The output of the DAC drives the scanning components, such as the stepping mirrors. The key is the number of the samples distributed over the bounds. This depends on the DAC sample rate, $SR_{DAC}$, the "pulse" duration, $\tau$, and the desired scan density. So, for a first dimension angle (e.g., vertical or elevation angle) extent E between the start and end bounds of a segment of the trajectory (e.g., lower and upper bounds of an in-slice segment of a vertical saw-tooth pattern), a DAC sample rate, $SR_{DAC}$, a pulse duration, $\tau$, and a desired scan density (target angular resolution) of $\Delta\theta$, the number of points, M, distributed linearly along the segment of the trajectory is calculated as given by Equation 5.

$$M = SR_{DAC} * \tau * E/\Delta\theta \qquad (5)$$

In Equation 5 note that $E/\Delta\theta$ is the number of pulses per elevation or azimuthal angular swath of the trajectory segment. $SR_{DAC}*\tau$ is the number of scanning optics control samples per pulse. The product is the number of control samples per swath.

The computation of Equation 5 is further illustrated by assuming the following system parameter values. For $\Delta\theta=10^{-4}$ radians (about 0.006 degrees) and E=0.5 radians (about 30 degrees) the number of samples per swath is 5,000. For pulse repetition frequency (PRF) of 100 kiloHertz (kHz, 1 kHz=$10^3$ hertz, Hz, 1 Hz=1 sample per second), the pulse duration is $\tau$=10 microseconds (μs, 1 μs=$10^{-6}$ seconds). For an output rate of analog signals from the DAC, $SR_{DAC}$, of 250 kHz, the number of control samples per pulse is $SR_{DAC}*\tau=2.5$; and, with 500 pulses per swath, the number of output control samples per swath to control the scanning optics form Equation 5 is 12,500. This is indicated in the commands passed to the scanning optics in some embodiments. In some embodiments, the DAC sample rate has some fixed values other than those computed from Equation 5. Such a fixed value can still be used. The discrepancy between this fixed value and the desired number of samples or time from Equation 5 can be sorted out in post-processing.

In some embodiments, a delay time for the local oscillator, $\Delta t_{LOn}$, is determined for each range gate sampling trajectory for range gate n using Equation 4, described above.

In step 1409, the computed adaptive scan trajectory for each range gate is delivered to the scanning laser ranging system. In some embodiments, this includes sending the scan rate (number of output control samples per swath) from Equation 5 and the delay time from Equation 4, as well as the minimum and maximum vertical angles and start and stop horizontal angles (or for other trajectories, the corresponding start and stop first dimension angles and the sets of maximum and maximum values for the second dimension).

5. COMPUTATIONAL HARDWARE OVERVIEW

Figure 8:
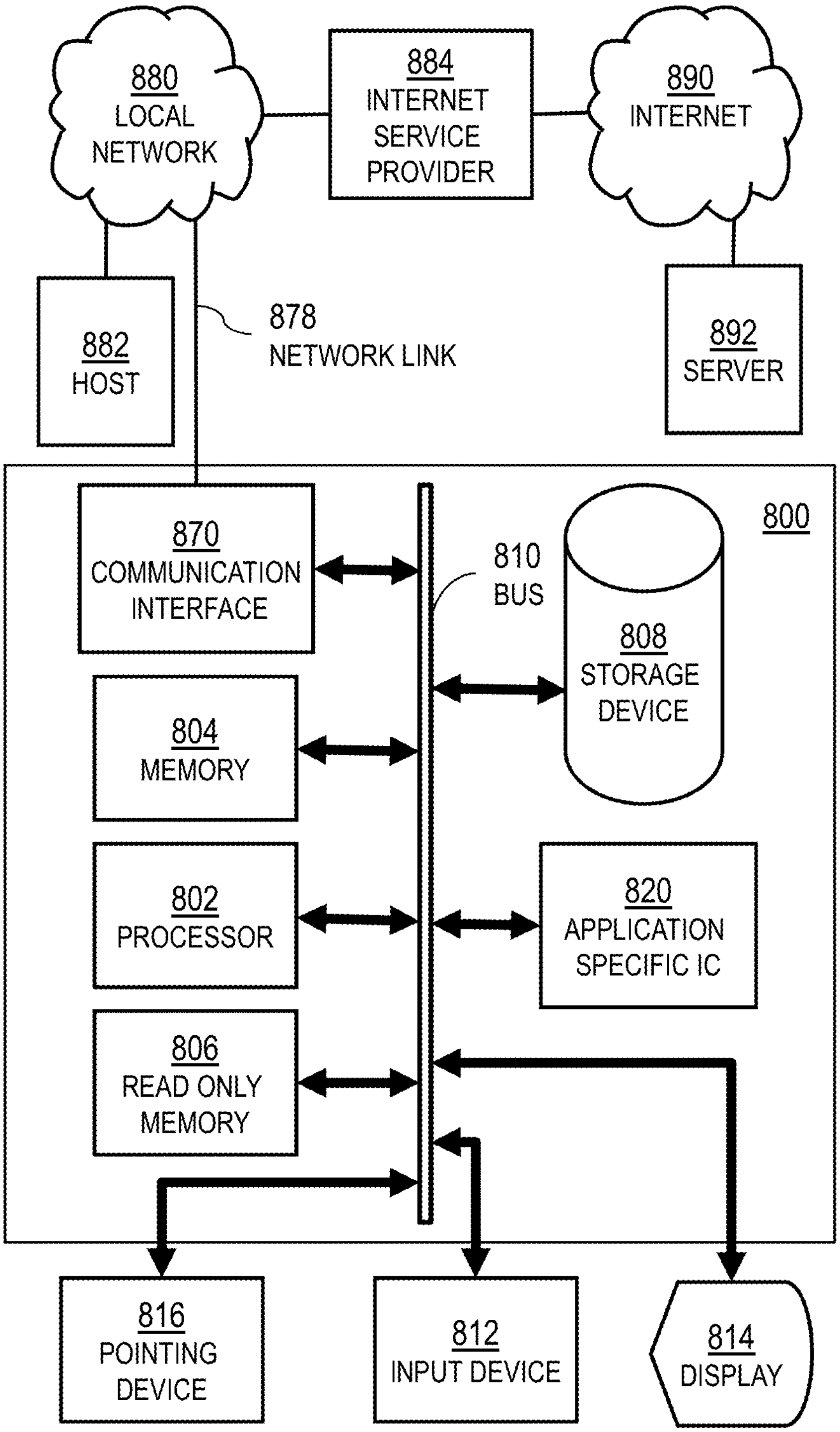
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a communication mechanism such as a bus 810 for passing information between other internal and external components of the computer system 800. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of one or more methods described herein.

A sequence of binary digits constitutes digital data that is used to represent a number or code for a character. A bus 810 includes many parallel conductors of information so that information is transferred quickly among devices coupled to the bus 810. One or more processors 802 for processing information are coupled with the bus 810. A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication. A sequence of operations to be executed by the processor 802 constitutes computer instructions.

Computer system 800 also includes a memory 804 coupled to bus 810. The memory 804, such as a random access memory (RAM) or other dynamic storage device, stores information including computer instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of computer instructions. The computer system 800 also includes a read only memory (ROM) 806 or other static storage device coupled to the bus 810 for storing static information, including instructions, that is not changed by the computer system 800. Also coupled to bus 810 is a non-volatile (persistent) storage device 808, such as a magnetic disk or optical disk, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into signals compatible with the signals used to represent information in computer system 800. Other external devices coupled to bus 810, used primarily for interacting with humans, include a display device 814, such as a cathode ray tube (CRT) or a liquid crystal display (LCD), for presenting images, and a pointing device 816, such as a mouse or a trackball or cursor direction keys, for controlling a position of a small cursor image presented on the display 814 and issuing commands associated with graphical elements presented on the display 814.

In the illustrated embodiment, special purpose hardware, such as an application specific integrated circuit (IC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 870 sends and receives electrical, acoustic or electromagnetic signals, including infrared and optical signals, that carry information streams, such as digital data.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 802, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 802, except for carrier waves and other signals.

Logic encoded in one or more tangible media includes one or both of processor instructions on a computer-readable storage media and special purpose hardware, such as ASIC 820.

Network link 878 typically provides information communication through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890. A computer called a server 892 connected to the Internet provides a service in response to information received over the Internet. For example, server 892 provides information representing video data for presentation at display 814.

The invention is related to the use of computer system 800 for implementing the techniques described herein. According to one embodiment of the invention, those techniques are performed by computer system 800 in response to processor 802 executing one or more sequences of one or more instructions contained in memory 804. Such instructions, also called software and program code, may be read into memory 804 from another computer-readable medium such as storage device 808. Execution of the sequences of instructions contained in memory 804 causes processor 802 to perform the method steps described herein. In alternative embodiments, hardware, such as application specific integrated circuit 820, may be used in place of or in combination with software to implement the invention. Thus, embodiments of the invention are not limited to any specific combination of hardware and software.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server 892 transmits program code for a particular application, requested by a message sent from computer 800, through Internet 890, ISP equipment 884, local network 880 and communications interface 870. The received code may be executed by processor 802 as it is received, or may be stored in storage device 808 or other non-volatile storage for later execution, or both. In this manner, computer system 800 may obtain application program code in the form of a signal on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red a carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
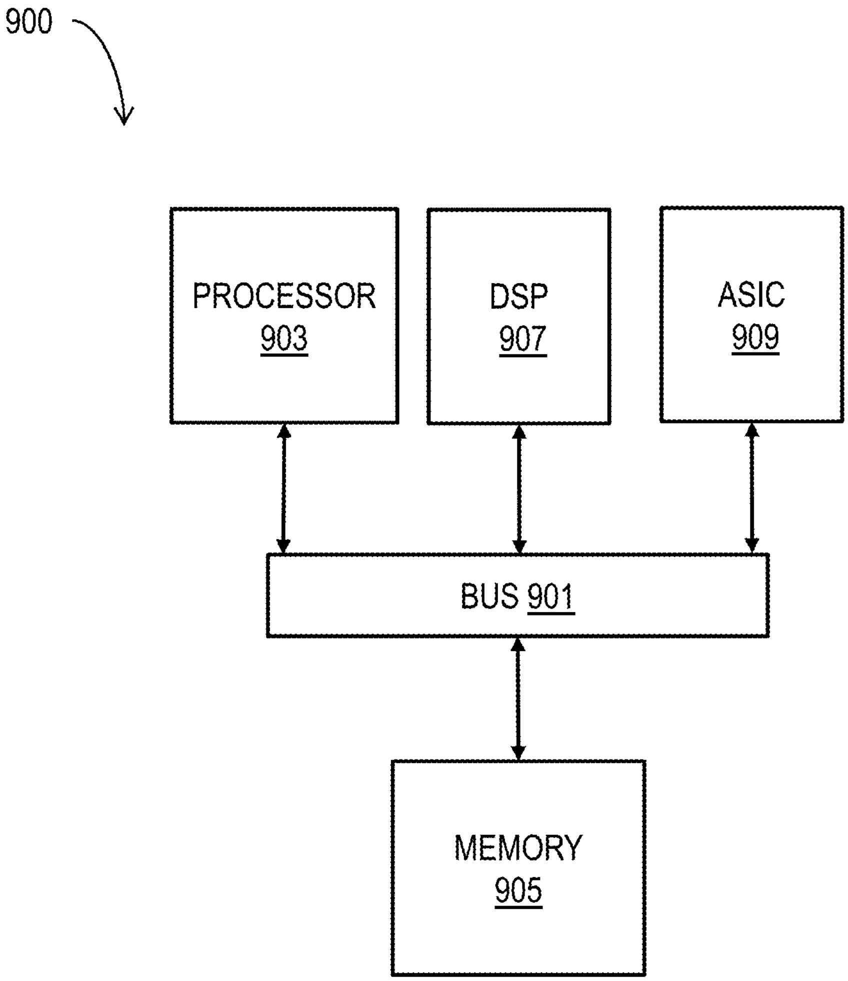
FIG. 9 is a block diagram that illustrates a chip set upon which an embodiment of the invention may be implemented.

FIG. 9 illustrates a chip set 900 upon which an embodiment of the invention may be implemented. Chip set 900 is programmed to perform one or more steps of a method described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of a method described herein.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 905 also stores the data associated with or generated by the execution of one or more steps of the methods described herein.

6. ALTERATIONS, EXTENSIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

7. REFERENCES

Adany, P., C. Allen, and R. Hui, "Chirped Lidar Using Simplified Homodyne Detection," Jour. Lightwave Tech., v. 27 (16), 15 Aug. 2009.

Haralick, R. M., S. R. Sternberg and X. Zhuang, "Image Analysis Using Mathematical Morphology," IEEE Transactions on Pattern Analysis and Machine Intelligence, v. PAMI-9 (4), July 1987.

Hui, R., C. Allen, and P. Adany, "Coherent detection scheme for FM Chirped laser RADAR," U.S. Pat. No. 7,742,152, 22 Jun. 2010.

What is claimed is:

1. A light detection and ranging (LIDAR) sensor system for a vehicle, comprising:

a laser source configured to generate a beam;

one or more scanning optics configured to transmit the beam; and one or more processors configured to:

operate the one or more scanning optics to obtain a first range over at least a first portion of a field of view of the one or more scanning optics at a coarse angular resolution;

identify, based on the first range, a range gate defining a second portion of the field of view;

assign a target final resolution to the range gate based on the first range; and operate the one or more scanning optics to obtain, at the target final resolution, a plurality of second ranges over the range gate.

2. The LIDAR sensor system of claim 1, wherein the range gate is defined from a first azimuth angle to a second azimuth angle and from a first elevation angle to a second elevation angle.

3. The LIDAR sensor system of claim 1, wherein the one or more processors are configured to:

operate the one or more scanning optics to obtain a plurality of first ranges in the at least the first portion of the field of view, wherein the plurality of first ranges includes the first range; and assign a subset of the plurality of first ranges to the first portion of the field of view to define the second portion of the range gate.

4. The LIDAR sensor system of claim 1, wherein the one or more processors are configured to:

operate the one or more scanning optics to obtain a plurality of first ranges in the at least the portion of the field of view, wherein the plurality of first ranges includes the first range; and wherein the plurality of second ranges have a denser spatial sampling than the plurality of first ranges.

5. The LIDAR sensor system of claim 1, wherein the one or more processors are configured to operate the one or more scanning optics to transmit the beam as a sawtooth scan pattern to obtain the plurality of second ranges over the range gate.

6. The LIDAR sensor system of claim 1, further comprising a modulator coupled with the laser source, wherein the modulator is configured to modulate at least one of a frequency or a phase of the beam.

7. The LIDAR sensor system of claim 1, further comprising a detector configured to receive a return beam from reflection of the transmitted beam by an object and to output an electrical signal to the one or more processors, wherein the electrical signal is indicative of the first range.

8. The LIDAR sensor system of claim 1, wherein the one or more processors are configured to determine the target final resolution as an angular resolution between scan points for the plurality of second ranges and based on a target spatial resolution for detection of an object in the second portion of the field of view.

9. The LIDAR sensor system of claim 1, wherein the target final resolution is greater than a width of the transmitted beam.

10. The LIDAR sensor system of claim 1, wherein the one or more processors are configured to generate a point cloud based on the plurality of second ranges.

11. A vehicle control system, comprising:

a laser source configured to generate a beam;

one or more scanning optics configured to transmit the beam; and one or more processors configured to:

operate the one or more scanning optics to obtain a first range over at least a first portion of a field of view of the one or more scanning optics at a coarse angular resolution;

identify, based on the first range, a range gate defining a second portion of the field of view;

assign a target final resolution to the range gate based on the first range;

operate the one or more scanning optics to obtain, at the target final resolution, a plurality of second ranges over the range gate; and control a vehicle based on the plurality of second ranges.

12. The vehicle control system of claim 11, wherein the one or more processors are configured to control the vehicle to avoid collision with an object corresponding to the plurality of second ranges.

13. The vehicle control system of claim 11, wherein the range gate is defined from a first azimuth angle to a second azimuth angle and from a first elevation angle to a second elevation angle.

14. The vehicle control system of claim 11, wherein the one or more processors are configured to:

operate the one or more scanning optics to obtain a plurality of first ranges in the at least the first portion of the field of view, wherein the plurality of first ranges includes the first range; and assign a subset of the plurality of first ranges to the first portion of the field of view to define the second portion of the range gate.

15. The vehicle control system of claim 11, wherein the one or more processors are configured to:

operate the one or more scanning optics to obtain a plurality of first ranges in the at least the portion of the field of view, wherein the plurality of first ranges includes the first range; and wherein the plurality of second ranges have a denser spatial sampling than the plurality of first ranges.

16. The vehicle control system of claim 11, wherein the one or more processors are configured to operate the one or more scanning optics to transmit the beam as a sawtooth scan pattern to obtain the plurality of second ranges.

17. The vehicle control system of claim 11, further comprising a modulator coupled with the laser source, wherein the modulator is configured to modulate at least one of a frequency or a phase of the beam.

18. The vehicle control system of claim 11, further comprising a detector configured to receive a return beam from reflection of the transmitted beam by an object and output an electrical signal to the one or more processors, wherein the electrical signal is indicative of the first range.

19. A method, comprising:

transmitting, by a laser, a beam;

operating, by one or more processors, a scanner to obtain a first range over at least a first portion of a field of view of the scanner at a coarse angular resolution;

identifying, based on the first range, a range gate defining a second portion of the field of view;

assigning, by the one or more processors, a target final resolution to the range gate based on the first range; and operating, by the one or more processors, the scanner to obtain, at the target final resolution, a plurality of second ranges over the range gate.

20. The method of claim 19, further comprising controlling, by the one or more processors, operation of a vehicle based on the plurality of second ranges.

* * * * *